United States Patent
Pahlevaninezhad et al.

(10) Patent No.: US 9,571,005 B2
(45) Date of Patent: Feb. 14, 2017

(54) ZVS VOLTAGE SOURCE INVERTER

(71) Applicants: Majid Pahlevaninezhad, Kingston (CA); Shangzhi Pan, Kingston (CA); Praveen Jain, Kingston (CA)

(72) Inventors: Majid Pahlevaninezhad, Kingston (CA); Shangzhi Pan, Kingston (CA); Praveen Jain, Kingston (CA)

( * ) Notice: Subject to any disclaimer, the term of this patent is extended or adjusted under 35 U.S.C. 154(b) by 148 days.

(21) Appl. No.: 14/590,684

(22) Filed: Jan. 6, 2015

(65) Prior Publication Data
US 2015/0194909 A1 Jul. 9, 2015

Related U.S. Application Data

(60) Provisional application No. 61/924,814, filed on Jan. 8, 2014.

(51) Int. Cl.
| | | |
|---|---|---|
| *H02M 7/68* | (2006.01) | |
| *H02M 3/24* | (2006.01) | |
| *H02M 7/44* | (2006.01) | |
| *H02M 7/537* | (2006.01) | |
| *H02M 7/5387* | (2007.01) | |
| *H02M 1/12* | (2006.01) | |
| *H02M 1/00* | (2006.01) | |
| *H02M 7/48* | (2007.01) | |

(52) U.S. Cl.
CPC ........... *H02M 7/5387* (2013.01); *H02M 1/126* (2013.01); *H02M 2001/0058* (2013.01); *H02M 2007/4815* (2013.01); *Y02B 70/1441* (2013.01); *Y02B 70/1491* (2013.01)

(58) Field of Classification Search
CPC .... H02M 7/4826; H02M 7/521; H02M 7/523; H02M 7/5233; H02M 7/5387; H02M 7/53873; H02M 2001/0054; H02M 2001/0058; H02M 2007/4815; H02M 2007/4811; H02M 1/083; H02M 1/4233; H02M 1/4241
USPC ..... 363/34, 35, 37, 39–43, 95–98, 131, 132, 363/135, 136
See application file for complete search history.

(56) References Cited

U.S. PATENT DOCUMENTS

| | | | | |
|---|---|---|---|---|
| 5,594,635 | A * | 1/1997 | Gegner | H02M 3/158 363/124 |
| 6,169,374 | B1 * | 1/2001 | Chang | H02M 1/425 315/224 |
| 6,356,461 | B1 * | 3/2002 | Jacobs | H02M 3/337 363/132 |
| 7,009,852 | B2 * | 3/2006 | Ying | H02M 3/1584 323/266 |
| 2007/0047612 | A1 * | 3/2007 | Keough | H05B 6/067 373/52 |

(Continued)

*Primary Examiner* — Adolf Berhane
*Assistant Examiner* — Gary Nash
(74) *Attorney, Agent, or Firm* — Brion Raffoul

(57) ABSTRACT

Systems and methods relating to zero voltage switching for inverters. A full bridge inverter is used in conjunction with a passive auxiliary circuit and an output filter. A control system controls the current by way of the auxiliary circuit and injects a high quality current to a power grid. The control system adjusts the duty ratio and switching frequency of the gate pulses applied to the power semiconductors in the full-bridge inverter. As well, the control system adjusts the phase shift between gate pulses for both the leading leg and lagging leg power semiconductors to control the current passing through the auxiliary circuit.

18 Claims, 20 Drawing Sheets

(56) References Cited

U.S. PATENT DOCUMENTS

| | | | | |
|---|---|---|---|---|
| 2007/0268725 | A1* | 11/2007 | Hatanaka | H02M 7/538 363/17 |
| 2011/0026282 | A1* | 2/2011 | Chapman | H02J 3/38 363/65 |
| 2011/0139771 | A1* | 6/2011 | Dohmeier | H02M 7/5387 219/661 |
| 2011/0211379 | A1* | 9/2011 | Chapman | H02M 7/53873 363/131 |
| 2011/0222326 | A1* | 9/2011 | Gray | H02M 7/53875 363/132 |
| 2012/0087165 | A1* | 4/2012 | Esram | H02J 3/383 363/97 |
| 2012/0127769 | A1* | 5/2012 | Kern | H02M 7/53871 363/132 |
| 2012/0262955 | A1* | 10/2012 | Yan | H02M 3/3376 363/21.02 |

* cited by examiner

Figure 1: Prior Art

ZVS VOLTAGE SOURCE INVERTER

RELATED APPLICATIONS

This application is a non-provisional application which claims the benefit of U.S. Provisional Patent Application No. 61/924,814 filed on Jan. 8, 2014.

TECHNICAL FIELD

The present invention relates to electronic circuits. More specifically, the present invention relates to circuits and methods relating to zero voltage switching for inverters.

BACKGROUND OF THE INVENTION

DC/AC inverters are commonly used for various applications such as renewable power conditioning systems, electric vehicles, etc. In particular, DC/AC inverters are widely used as the second stage in two-stage renewable energy power conditioning systems. The DC/AC inverter usually operates under hard-switching conditions (i.e., neither the voltage nor the current of the power switches is zero during the switching transitions). The power semiconductors of the DC/AC inverter are switched under very high voltage at the intermediate DC-bus (usually more than 400 volts). Therefore, power semiconductors' switching losses for such inverters significantly contribute to the overall losses of the power conditioning system. In particular, the reverse recovery losses of the body diodes of the power semiconductors are inevitable for such a structure. The switching frequency of the inverter is therefore very limited (usually in the range of 10-20 kHz).

It should be noted that, for inverters, having a low switching frequency gives rise to a number of issues. Inverters with a low switching frequency require larger filters at the output to be able to inject a high quality current to the utility grid according to the strict regulatory standards. Also, a low switching frequency creates a high amount of current ripple across the inverter output inductor. This current ripple increases the core losses of the inductor as well as its high frequency copper losses. In addition, chopping the DC-bus voltage creates a significant amount of conduction and emission EMI noise, which may affect the operation of the control system and highly degrade the system reliability. Based on the above, hard-switching limits the switching frequency of the inverter and, because of this, imposes a substantial compromise in the design of the output filter and on the overall performance of the power conditioning systems.

While there are different soft-switching techniques reported in the literature, these techniques generally require many extra active/passive circuits. In particular, extra active circuits highly deteriorate the reliability of the system due to the additional complexity imposed by the active components. Also, the effectiveness of these techniques is questionable. Some studies have shown that these soft-switching techniques may add more losses to the inverter and, accordingly, greatly offset whatever advantages they may offer. Because of this, most industrial products use conventional hard-switching inverters in conjunction with a large filter to result in reliable power conditioning systems. Even though the performance of these systems is highly compromised with hard-switching and bulky lossy filters, industry prefers to use a reliable, well-known solution for the inverter.

Auxiliary circuits have been used to provide soft-switching condition for the power semiconductors of a voltage source inverter. Some soft-switching circuits use a combination of an active circuit in conjunction with passive circuits to provide soft-switching conditions. However, this approach has its drawbacks. Generally, active circuits increase the complexity of the power circuit while reducing the reliability of the systems. In addition, the losses related to the auxiliary circuits usually greatly offset the advantages of soft-switching and compromises the overall inverter performance. FIG. 1 shows a conventional auxiliary circuit used to provide soft-switching for a leg of the inverter. According to FIG. 1, usually, the auxiliary circuit includes a resonant circuit with a very high amount of peak current/voltage in conjunction with a bi-directional switch. Because of this, there are significant amount of losses which can be attributed to the auxiliary circuit. As well, there can be an added requirement that the passive components should be able to withstand the high amount current/voltage during switching transitions.

Based on the above, there is a need for a simple and practical solution which, preferably, can provide soft-switching for the power semiconductors without compromising system reliability. There is a need for solutions which mitigate if not overcome the drawbacks of the prior art.

SUMMARY OF INVENTION

The present invention provides systems and methods relating to zero voltage switching for inverters. A full bridge inverter is used in conjunction with a passive auxiliary circuit and an output filter. A control system controls the current of the auxiliary circuit and the current injected to the utility grid. The control system adjusts the duty ratio and switching frequency of the gate pulses applied to the power semiconductors in the full-bridge inverter. As well, the control system adjusts the phase shift between gate pulses for both the leading leg and lagging leg power semiconductors to control the current passing through the auxiliary circuit.

In one embodiment, the invention therefore includes a full-bridge inverter, a passive auxiliary circuit, an output filter, and a control system. The control system optimally controls the current through the auxiliary circuit and injects a high quality current to the utility grid. The auxiliary circuit provides reactive current in order to provide Zero Voltage Switching (ZVS) condition for the power semiconductors in the inverter. The reactive current charges the output capacitor of one power semiconductor and discharges the output capacitor of the other semiconductor in one leg of the full-bridge inverter during switching transitions. By doing this, the semiconductors are switched on at zero voltage. This eliminates the switching losses of the power semiconductors at turn-on and also removes the reverse recovery losses of the body diodes of the power semiconductors. The present invention simultaneously controls the output current of the DC/AC inverter and the current through the auxiliary circuit.

In one aspect, the control technique of the invention adjusts the duty ratio of the gate pulses applied to the power semiconductors to control the output current of the DC/AC inverter. As well, the technique adjusts both the switching frequency of the gate pulses and the phase-shift between the gate pulses of leading leg power and lagging-leg power semiconductors to control the current through the auxiliary circuit. The switching frequency and the phase-shift are controlled in a specific way to optimize the amount of current flowing through the auxiliary circuit. This minimizes the losses associated with the auxiliary circuit. This also minimizes extra current flowing through the power semiconductors due to the auxiliary circuit. The switching frequency and the phase-shift are adjusted such that there is just enough current to charge and discharge the output capacitors of the semiconductors in one leg of the full-bridge inverter during the switching transitions. The optimal switching frequency and the phase-shift are therefore dependent on the inverter output current, the input voltage of the inverter (DC-bus voltage), the auxiliary circuit components, and the output capacitors of the power semiconductors.

The control system according to the invention adjusts three control inputs: the duty cycle, the switching frequency, and the phase-shift (phase-shift between the gate pulses of two legs of the inverter). The duty ratio is used to control the current injected to the grid while the switching frequency and the phase-shift are used to optimize the performance of the auxiliary circuit and provide ZVS condition.

In a first aspect, the present invention provides a circuit comprising:
- a DC bus capacitor;
- a full bridge inverter coupled in parallel to said DC bus capacitor;
- an output filter coupled to said full bridge inverter;
- an auxiliary circuit coupled to said inverter;
- wherein
- said full bridge inverter comprises a leading leg and a lagging leg, each leg comprising a pair of power semiconductor subcircuits coupled in series to each other, said leading leg having its pair of power semiconductor subcircuits being coupled to each other at a first coupling point, said lagging leg having its pair of power semiconductor subcircuits being coupled to each other at a second coupling point;
- said auxiliary circuit comprises an auxiliary inductor coupled in series to an auxiliary capacitor, said auxiliary circuit being coupled between said first coupling point and said second coupling point;
- said output filter comprises a pair of inductors and a capacitor, said pair of inductors being coupled to each other in series by way of a third coupling point, said capacitor being coupled between said second coupling point and said third coupling point, a first one of said pair of inductors being coupled to said first coupling point;
- an output of said circuit being coupled between said second coupling point and a second one of said pair of inductors.

In a second aspect, the present invention provides a method for minimizing switching losses in a full-bridge inverter system, the method comprising:
- adjusting a duty ratio of gate pulses applied to power semiconductors in said inverter system to control an output of said inverter system;
- adjusting a switching frequency and a phase-shift of said gate pulses to control a current passing through an auxiliary circuit coupled to an inverter circuit in said inverter system;
- wherein
- said switching frequency and said phase-shift are adjusted to charge and discharge output capacitors associated with power semiconductors in one leg of said inverter circuit during switching transitions for said inverter circuit;
- said inverter circuit comprises a leading leg and a lagging leg, each leg comprising a pair of power semiconductor subcircuits coupled in series to each other, said leading leg having its pair of power semiconductor subcircuits being coupled to each other at a first coupling point, said lagging leg having its pair of power semiconductor subcircuits being coupled to each other at a second coupling point;
- said auxiliary circuit comprises an auxiliary inductor coupled in series to an auxiliary capacitor, said auxiliary circuit being coupled between said first coupling point and said second coupling point;
- said inverter system comprises an output filter, said output filter comprising a pair of inductors and a capacitor, said pair of inductors being coupled to each other in series by way of a third coupling point, said capacitor being coupled between said second coupling point and said third coupling point, a first one of said pair of inductors being coupled to said first coupling point;
- an output of said inverter system is coupled between said second coupling point and a second one of said pair of inductors.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In one aspect, the present invention provides soft-switching circuits along with control methods for a single-phase voltage source inverter.

Switching losses are one of the main sources of power losses in a single-phase voltage source inverter. Switching losses are due to the overlap between the voltage across the power semiconductor and the current flowing through the power semiconductor during switching transitions. The switching losses are proportionally related to the switching frequency of the inverter. Therefore, in order to have a reasonable amount of losses the switching frequency of the inverter is limited, depending on the application (the switching frequency is usually between 10-20 kHz. Voltage source inverters operating with low switching frequency require a large filter in order to attenuate the switching noise and produce a high quality output current. In addition, a high amount of current ripple caused by a low switching frequency across the filter inductor causes a high amount of core losses in the filter inductor. There are several other disadvantages such as high amount of EMI (electromagnetic interference), noisy and unreliable control system, and limited control bandwidth, imposed by hard-switching of the power semiconductors in a voltage source inverter. Thus, soft-switching techniques can effectively eliminate the disadvantages of hard-switched inverters and offer substantial improvements in the performance of the voltage source inverter.

This invention provides passive auxiliary circuits in conjunction with specific control methods to provide soft-switching condition, with minimal compromise on the performance of the inverter. In particular, the auxiliary circuit along with the specific control methods are proposed in order to provide soft-switching for a single-phase voltage source inverter.

Figure 1:
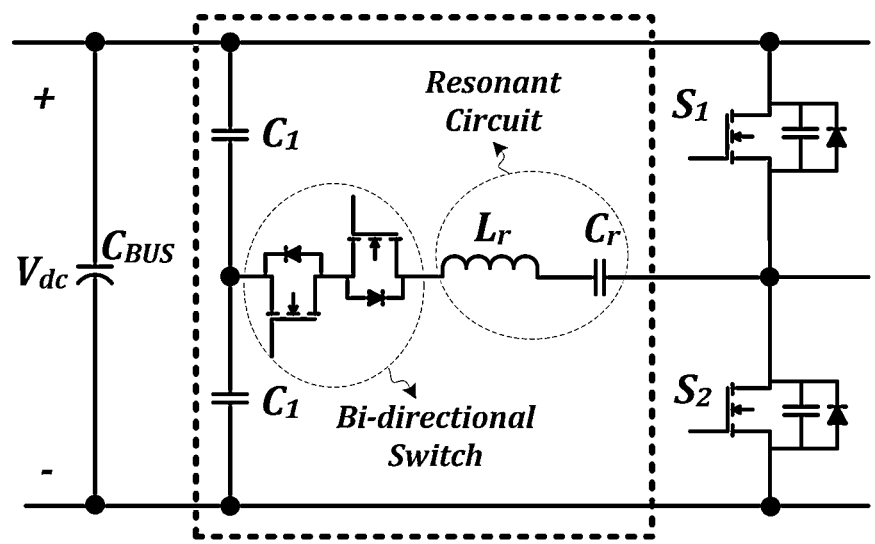
FIG. 1 is a circuit diagram of a conventional auxiliary circuit.
Figure 2:
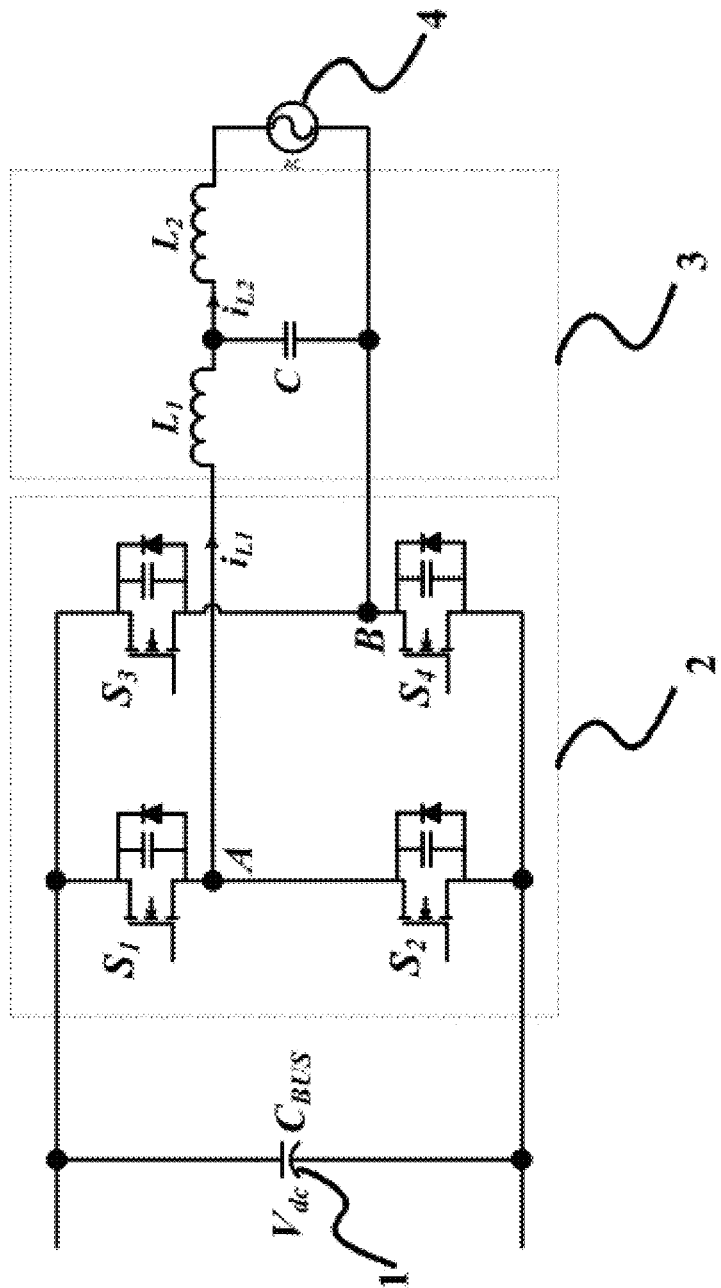
FIG. 2 is a circuit diagram of an exemplary single-phase voltage source inverter.

The arrangement in FIG. 2 shows an exemplary arrangement of a single-phase voltage source inverter. According to FIG. 2, the single-phase voltage source inverter includes a DC-Bus Capacitor 1, a Full Bridge Inverter 2, an LCL-Filter 3 as the output filter. The inverter is connected to the Grid 4. The LCL-Filter 3 is coupled to the Full Bridge Inverter 2 and has a pair of inductors $L_1$ and $L_2$ coupled in series to one another. The LCL-Filter 3 has a capacitor C coupled to a point between the two inductors.

The single-phase voltage source inverter can operate with either bi-polar voltage switching or uni-polar voltage switching. In bi-polar inverters, the output voltage of the inverter is switched between $+V_{dc}$ and $-V_{dc}$. Whereas, in uni-polar inverters the inverter output voltage is switched between either $+V_{dc}$ and 0 or 0 and $-V_{dc}$.

Figure 3:
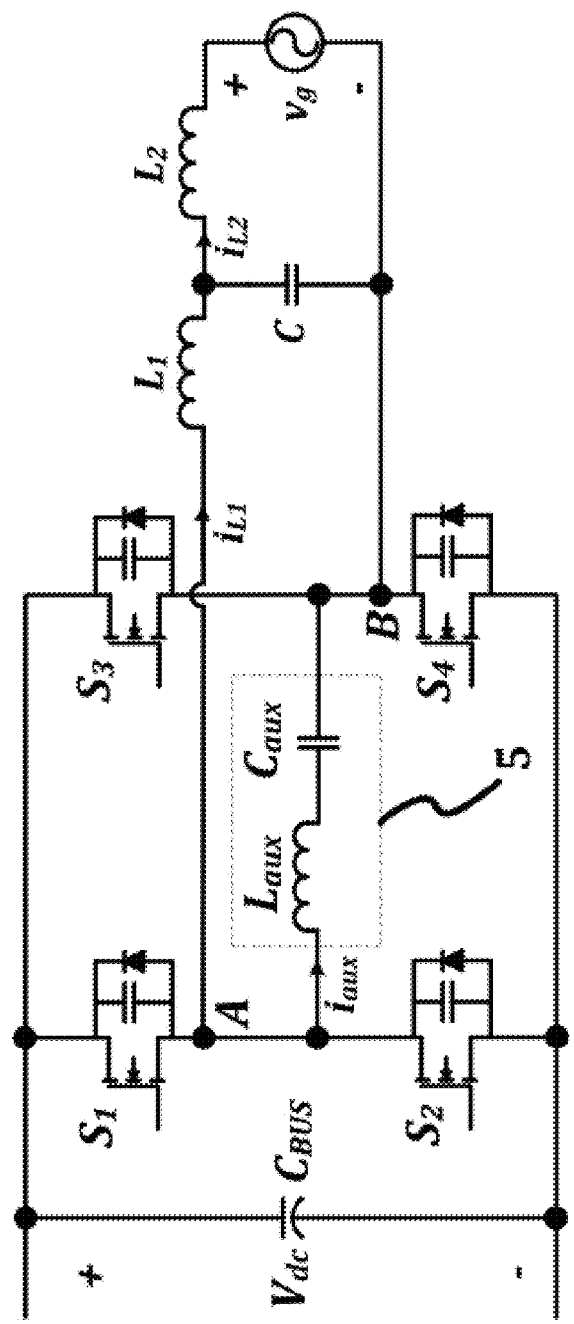
FIG. 3 is a zero voltage switching bi-polar inverter according to one aspect of the invention.

The topology in the present invention is based on the bi-polar voltage switching inverter. The arrangement in FIG. 3 shows a ZVS bi-polar inverter according to one aspect of the present invention. According to FIG. 3, the auxiliary circuit 5 has an auxiliary inductor $L_{aux}$ in series with an auxiliary capacitor $C_{aux}$ and the auxiliary circuit is placed in between the two legs of the inverter. The first leg, which includes power semiconductor subcircuits $S_1$ and $S_2$ is called the "leading-leg" and the second leg, which consists of power semiconductor subcircuits $S_3$ and $S_4$ is called the "lagging-leg". Each power semiconductor subcircuit has a power semiconductor with a capacitor (include the equivalent output capacitor of the power semiconductor) and a body diode. The auxiliary circuit 5 is coupled to the leading leg at a first coupling point between the subcircuits $S_1$ and $S_2$. This auxiliary circuit is coupled to the lagging leg at a second coupling point between subcircuits $S_3$ and $S_4$. The LCL-Filter 3 is coupled to the leading leg at the first coupling point and is coupled to the lagging leg at the second coupling point. In the LCL-Filter 3, the capacitor is coupled between the second coupling point and a third coupling point that joins the inductors $L_1$ and $L_2$ to each other.

The current flowing through the auxiliary circuit 5 provides the soft-switching condition for the inverter power semiconductors. In particular, the current produced by the auxiliary circuit 5 discharges the output capacitors of the power semiconductors prior to the turn-on time. Thus, the semiconductor is turned-on under zero voltage.

This invention takes advantage of other control parameters, which are the phase-shift between the gate pulses of the two inverter legs, and the switching frequency in order to control the current flowing through the auxiliary circuit. The phase-shift between the two legs and the switching frequency offer great flexibility in controlling the current flowing through the auxiliary circuit without affecting the output voltage. In order to clarify the impact of the phase-shift on the auxiliary circuit current and the operation of the DC/AC inverter, eight possible modes of operation are analysed. Four modes are in positive line cycle and the other four are in negative line cycle.

Figure 4:
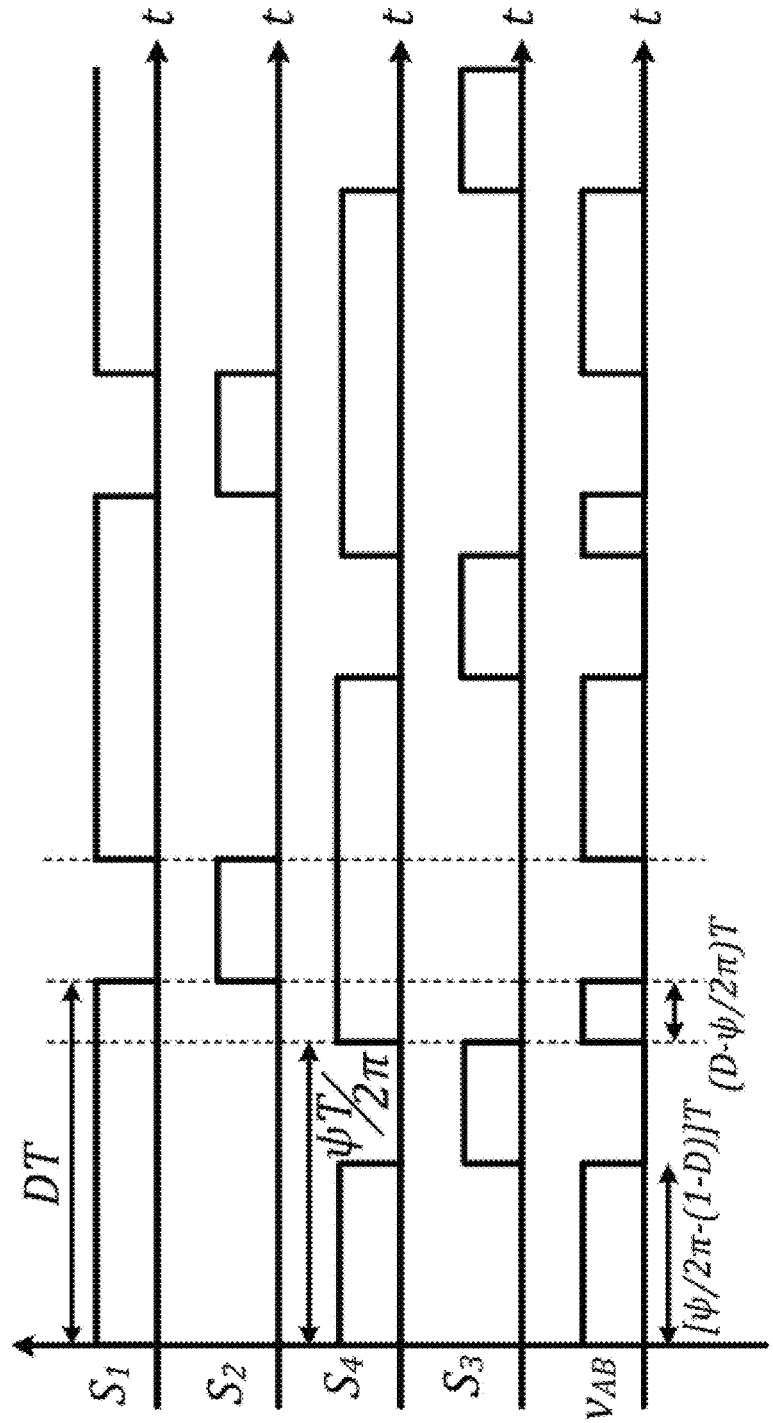
FIG. 4 is a waveform illustrating a first operating mode of the invention where D≥50%, $$\frac{\psi}{2\pi} \geq 50\%, \text{ and } \frac{\psi}{2\pi} \leq D;$$

At first the operation in the positive line cycle is analysed. In the positive line cycle there are four possible operating modes depending on the duty-ratio D, and the phase-shift ψ. FIG. 4 shows the first operating mode. In this mode of operation, D≥50%, $$\frac{\psi}{2\pi} \geq 50\%, \text{ and } \frac{\psi}{2\pi} \leq D.$$

Figure 5:
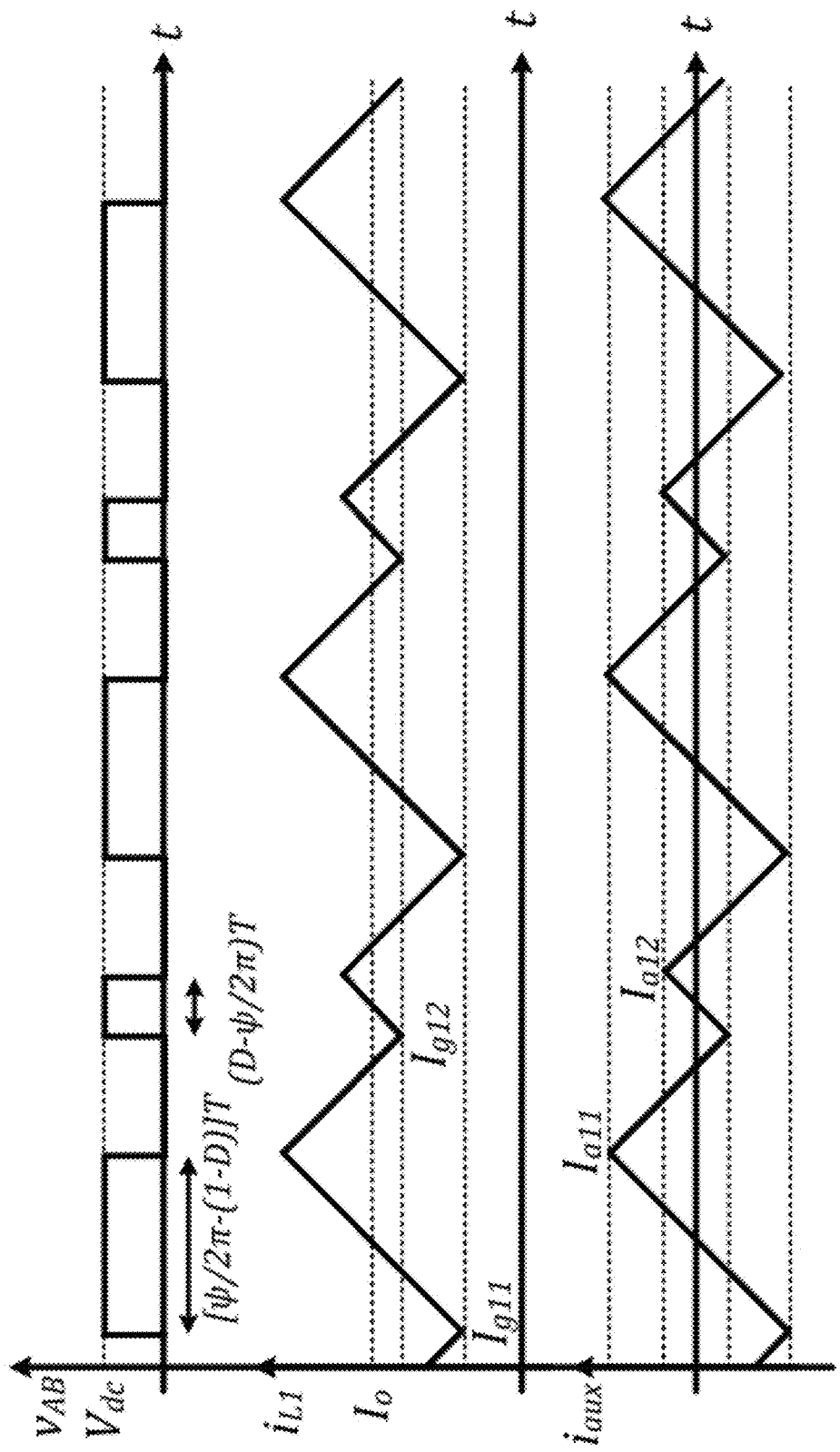
FIG. 5 is a waveform showing the inverter's output voltage, current through the inverter-side inductor and auxiliary circuit current during the first operating mode.

In this mode of operation, the output voltage of the inverter, $v_{AB}$ is switching between the DC-bus voltage, $V_{dc}$ and 0. Also, the effective switching of the inverter output voltage, $v_{AB}$ is two times the switching frequency. FIG. 5 shows the inverter output voltage, current through the inverter-side inductor and the auxiliary circuit current when D>50%, $$\frac{\psi}{2\pi} \geq 50\%, \text{ and } \frac{\psi}{2\pi} < D.$$

According to this figure, in order to provide ZVS condition for the power semiconductors, the following conditions should be satisfied:

$$I_{a11} \geq I_{g11} + I_z \tag{1}$$

$$I_{a12} \geq I_{g12} + I_z \tag{2}$$

In Equations (1) and (2), $I_z$ is the current required to charge and discharge the output capacitors of the semiconductors of the legs. $I_z$ is given by:

$$I_z = C_{So} \frac{V_{dc}}{t_d} \tag{3}$$

where $C_{So}$ represents the output capacitors of the power semiconductors. Also, $t_d$ is the dead-times between the gate pulses of the two switches in the legs. Equations (1) and (2) result in the following conditions for ZVS:

$$\frac{v_{dc}}{L_{aux}f}(1-D)\left[\frac{\psi}{2\pi} - (1-D)\right] \geq \tag{4}$$
$$\left(I_o - \frac{V_{dc} - v_g}{2L_g f}\left[\frac{\psi}{2\pi} - (1-D)\right]\right) + C_{So}\frac{V_{dc}}{t_d}$$

$$\frac{v_{dc}}{L_{aux}f}(1-D)\left(D - \frac{\psi}{2\pi}\right) \geq \left(I_o - \frac{V_{dc} - v_g}{2L_g f}\left(D - \frac{\psi}{2\pi}\right)\right) + C_{So}\frac{V_{dc}}{t_d} \tag{5}$$

It should be noted that $L_g$ is the sum of $L_1$ and $L_2$, the inductances in the LCL-Filter subcircuit illustrated in FIG. 3.

According to FIG. 5 and the fact that $I_{g12} \geq I_{g11}$, the optimal amount of auxiliary circuit current is achieved when $$I_{a11} = I_{a12}; I_{g11} = I_{g12} \tag{6}$$

Equation (6) is achieved when the phase-shift between the two legs is $\pi$. In this condition, the optimal switching frequency and the optimal phase-shift are given by:

$$f_{opt}^{1P} = \frac{(D - 0.5)[2L_g V_{dc}(1-D) + L_{aux}(V_{dc} - v_g)]}{2L_g L_{aux}\left(I_o + C_{So}\frac{V_{dc}}{t_d}\right)} \tag{7}$$

$$\psi_{opt}^{1P} = \pi \tag{8}$$

The second operating mode is when $D \geq 50\%$, $$\frac{\psi}{2\pi} \leq 50\%, \text{ and } \frac{\psi}{2\pi} \geq D - 1.$$

Figure 6:
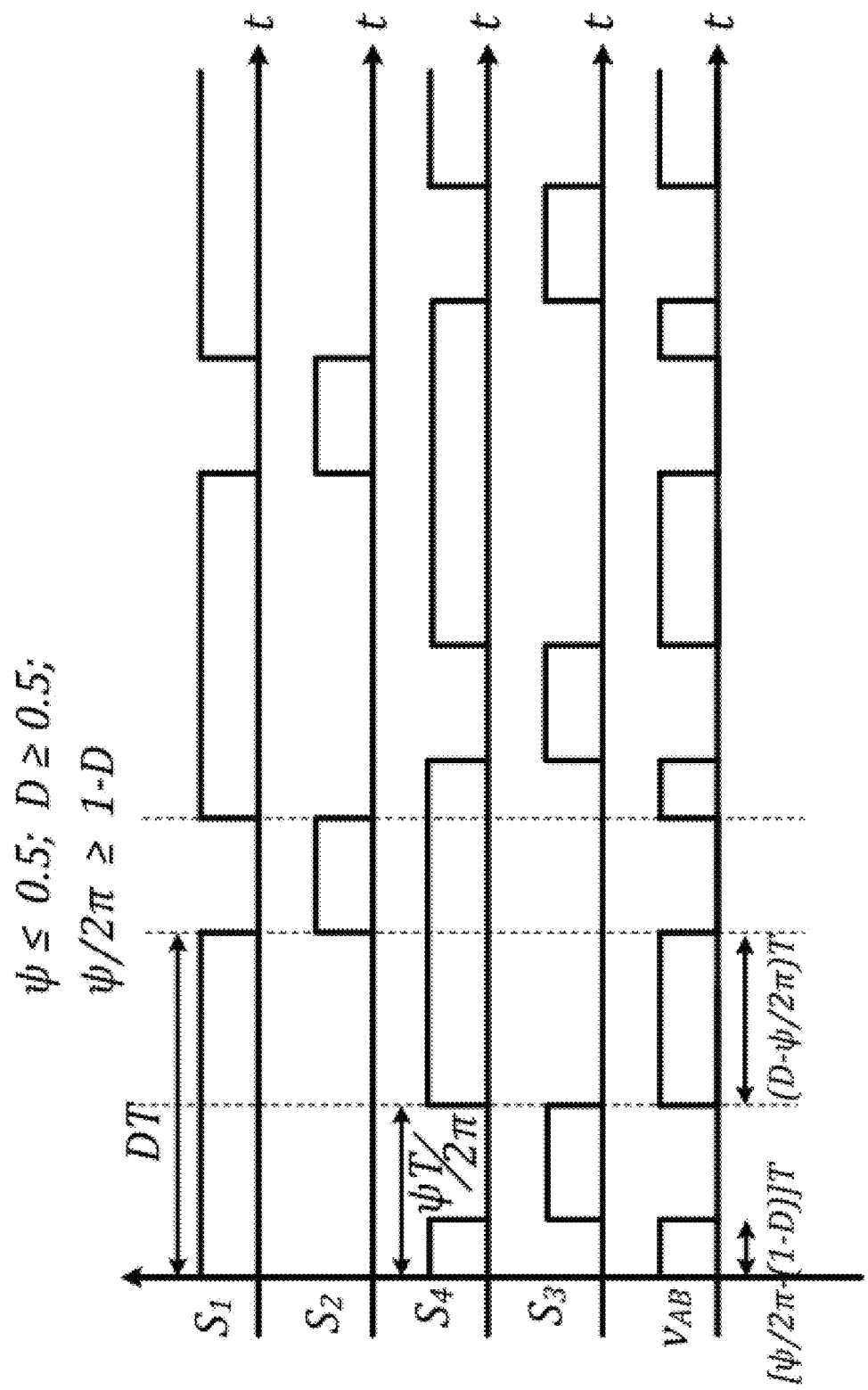
FIG. 6 are waveforms for the second operating mode when D≥50%, $$\frac{\psi}{2\pi} \leq 50\%, \text{ and } \frac{\psi}{2\pi} \geq D-1;$$

In this mode of operation, the output voltage of the inverter, $v_{AB}$ is also switching between the DC-bus voltage, $V_{dc}$ and 0 and the effective switching of the inverter output voltage, $v_{AB}$ is two times the switching frequency. The waveforms in this mode of operation is similar to the first case and the derivation for ZVS are the same. Therefore, the optimal operation is achieved when the phase-shift between the legs is equal to $\pi$ and the optimal switching frequency and the optimal phase-shift are given by Equations (7) and (8). See FIG. 6.

The third operating mode is when $D \geq 50\%$, $$\frac{\psi}{2\pi} \geq 50\%, \text{ and } \frac{\psi}{2\pi} \geq D.$$

Figure 7:
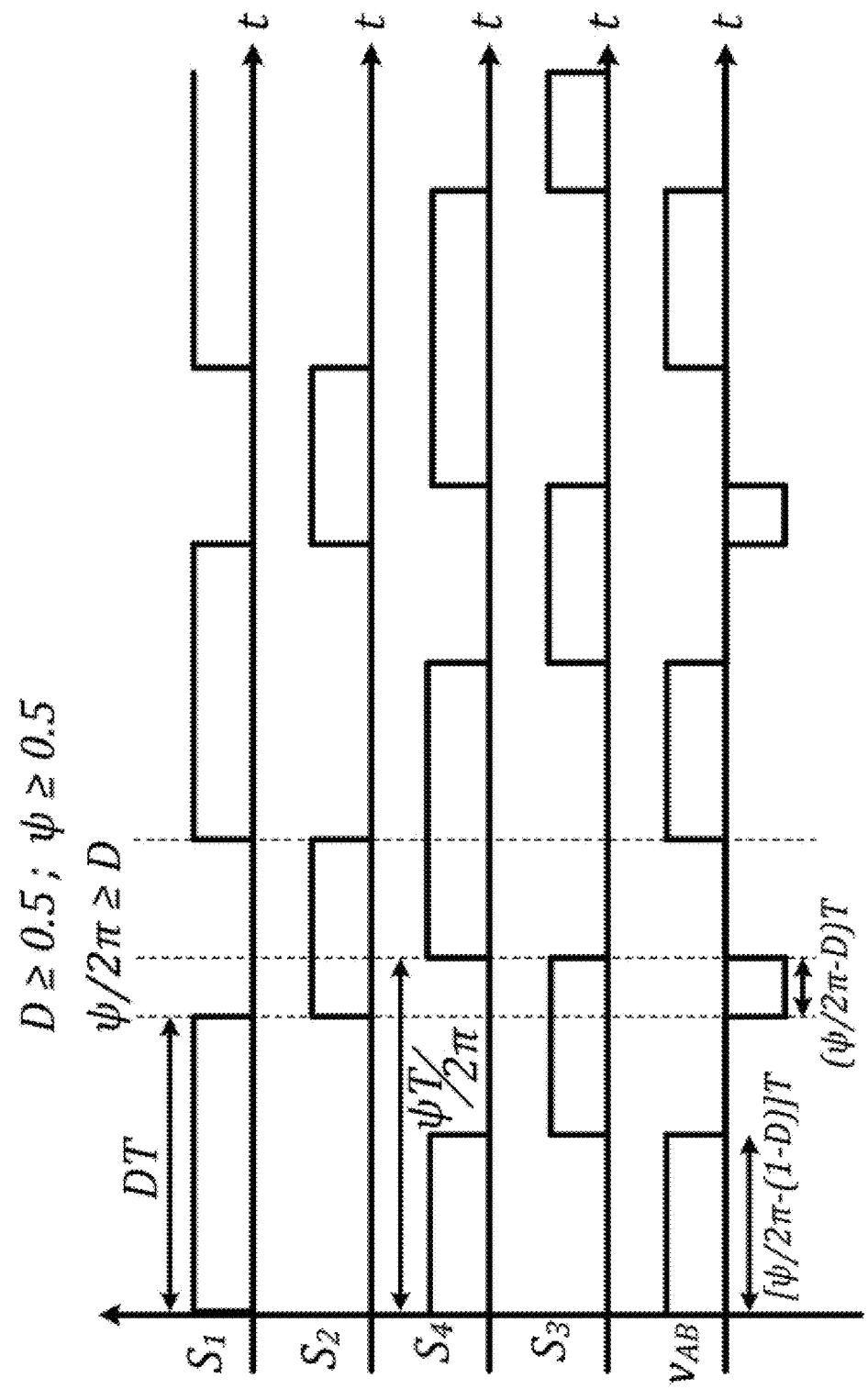
FIG. 7 are switching waveforms for the third operating mode when D≥50%, $$\frac{\psi}{2\pi} \geq 50\%, \text{ and } \frac{\psi}{2\pi} \geq D;$$
Figure 8:
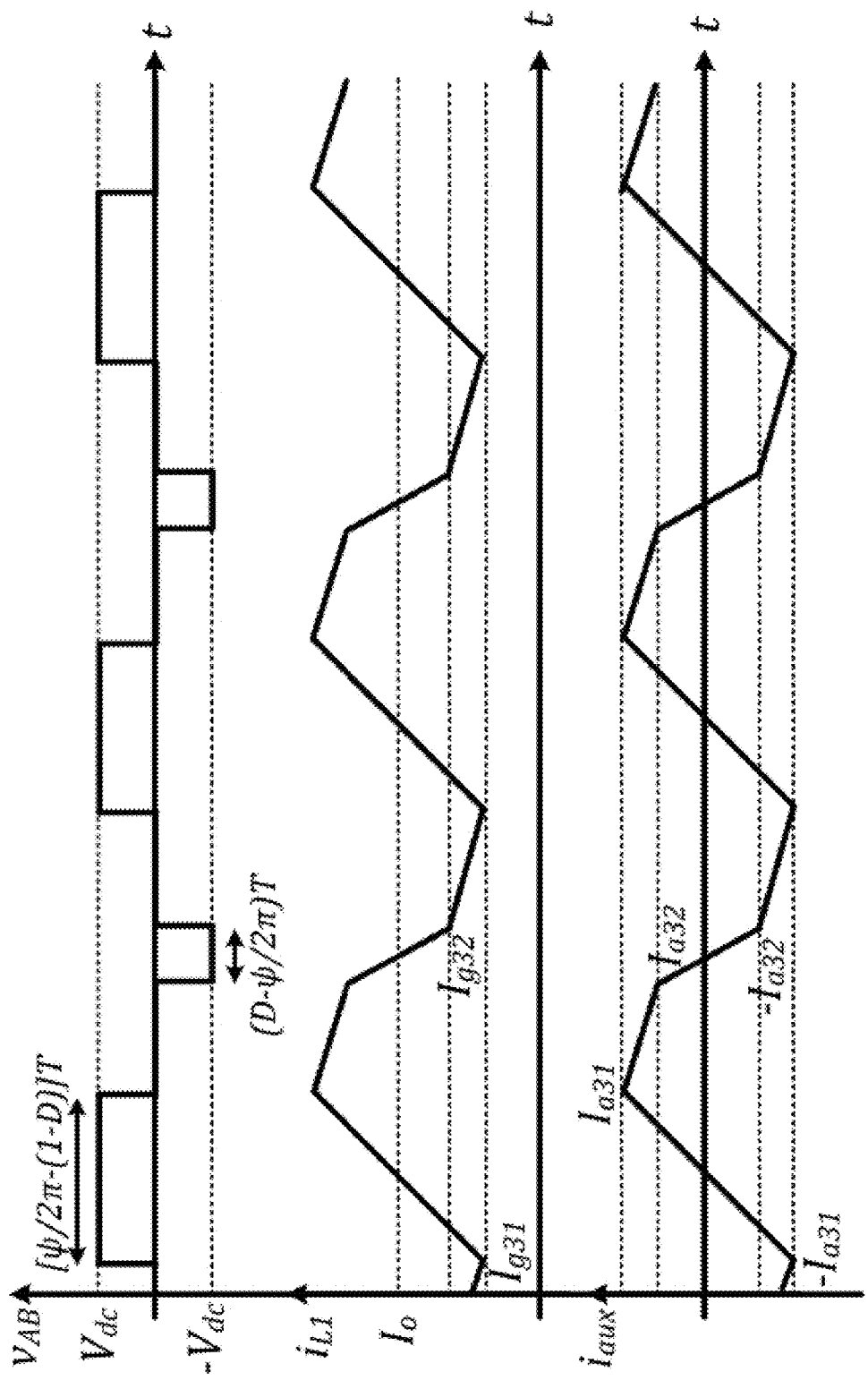
FIG. 8 are waveforms showing the inverter output voltage, current through the inverter-side inductor, and auxiliary circuit current during the third operating mode.

In this operating mode, the inverter output voltage switches between three levels, $V_{dc}$, 0, and $-V_{dc}$. FIG. 7 shows the switching waveforms of the third mode. FIG. 8 shows the inverter output voltage, current through the inverter-side inductor and the auxiliary circuit current when $D \geq 50\%$, $$\frac{\psi}{2\pi} \geq 50\%, \text{ and } \frac{\psi}{2\pi} \geq D.$$

According to this figure, in order to provide ZVS condition for the power semiconductors, the following conditions should be satisfied:

$$I_{a31} \geq I_{g31} + I_z \tag{9}$$

$$I_{a32} \geq I_{g32} + I_z \tag{10}$$

According to FIG. 8, Equations (9) and (10), the ZVS conditions are derived as:

$$\frac{v_{dc}}{L_{aux}f}(1-D)\left[\frac{\psi}{2\pi} - (1-D)\right] \geq \tag{11}$$
$$\left(I_o - \frac{V_{dc} - v_g}{2L_g f}\left[\frac{\psi}{2\pi} - (1-D)\right]\right) + C_{So}\frac{V_{dc}}{t_d}$$

$$\frac{v_{dc}}{L_{aux}f}(1-D)\left(\frac{\psi}{2\pi} - D\right) \geq \left[I_o - \frac{V_{dc} + v_g}{2L_g f}\left(\frac{\psi}{2\pi} - D\right)\right] + C_{So}\frac{V_{dc}}{t_d} \tag{12}$$

According to Equations (11) and (12), the optimal values of the switching frequency and the phase-shift are derived as:

$$\psi_{opt}^{3P} = 2\pi \frac{V_{dc}(1 - 2D) - v_g}{\frac{2L_g}{L_{aux}}V_{dc}(1 - 2D) - 2v_g} \tag{13}$$

$$f_{opt}^{3P} = \frac{2L_g V_{dc} D\left(\frac{\psi_{opt}^{3P}}{2\pi} - D\right) + L_{aux}(V_{dc} + v_g)\left(\frac{\psi_{opt}^{3P}}{2\pi} - D\right)}{2L_g L_{aux}\left(I_o + C_{So}\frac{V_{dc}}{t_d}\right)} \tag{14}$$

The fourth operating mode is when $D \geq 50\%$, $$\frac{\psi}{2\pi} \leq 50\%, \text{ and } \frac{\psi}{2\pi} \leq 1 - D.$$

Figure 9:
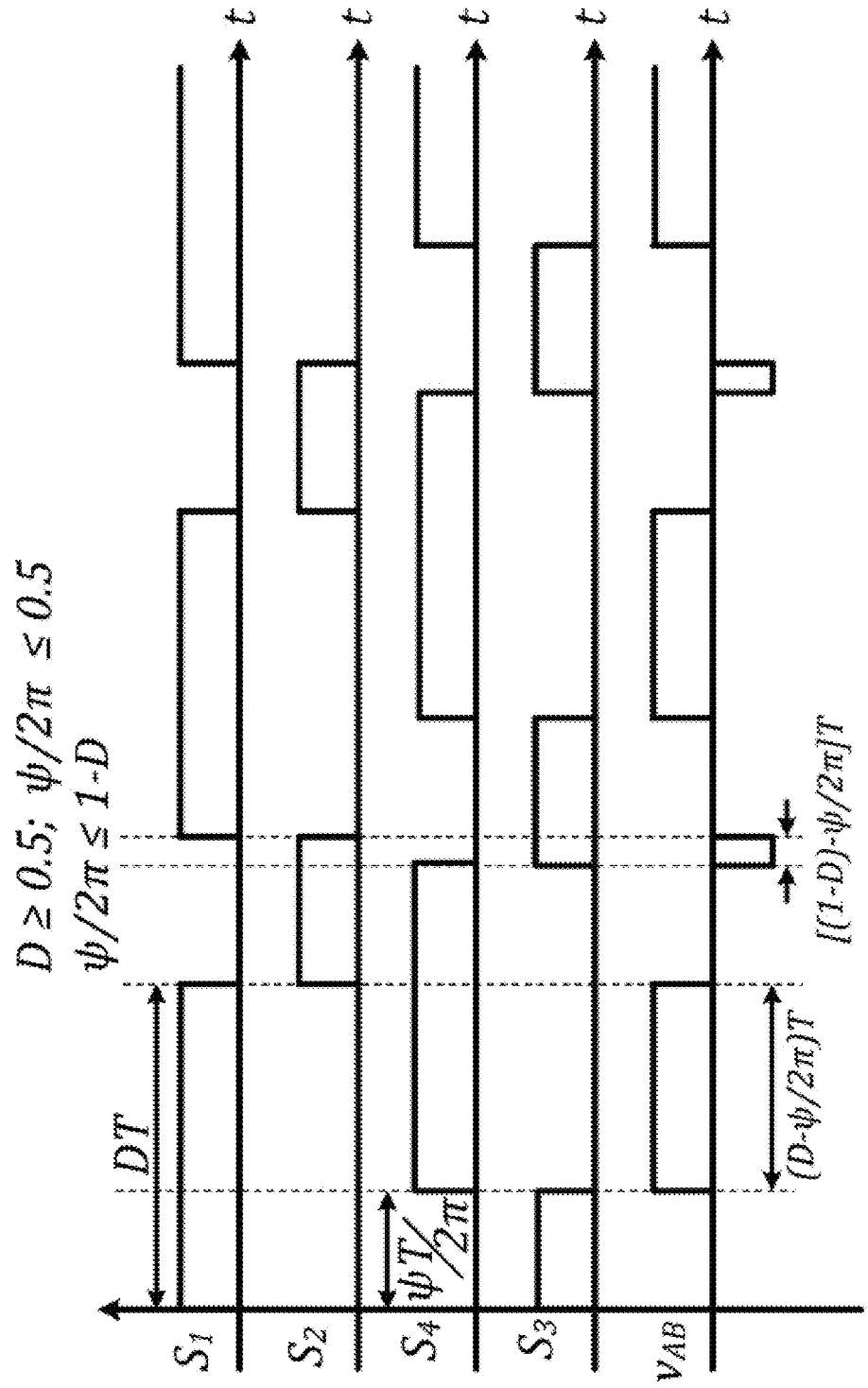
FIG. 9 are the switching waveforms for the inverter in a fourth operating mode where D≥50%, $$\frac{\psi}{2\pi} \leq 50\%, \text{ and } \frac{\psi}{2\pi} \leq 1-D;$$
Figure 10:
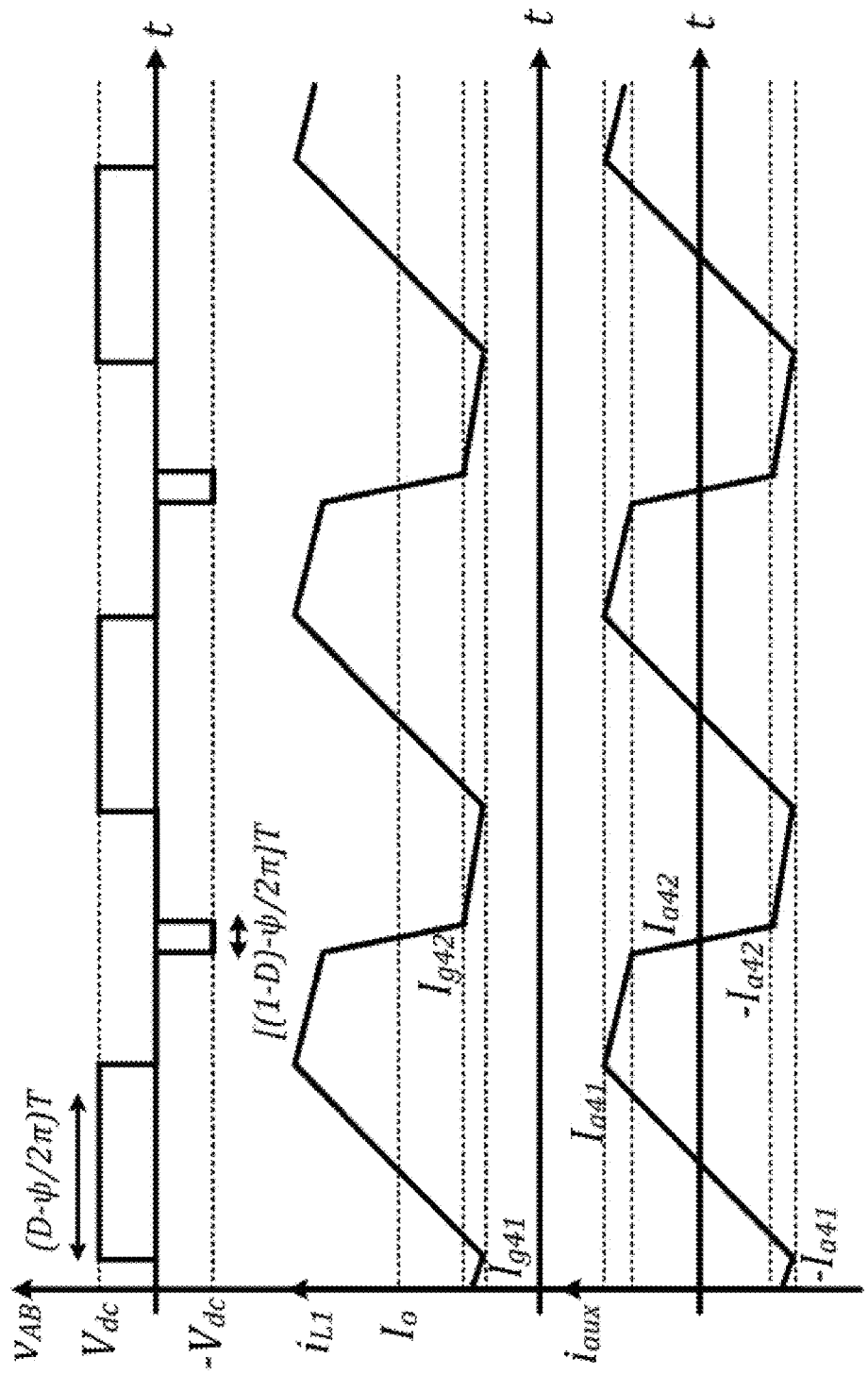
FIG. 10 are waveforms illustrating the inverter output voltage, current through the inverter-side inductor, and auxiliary circuit current during the fourth operating mode.

In this operating mode, the inverter output voltage switches between three levels, $V_{dc}$, 0, and $-V_{dc}$. FIG. 9 shows the switching waveforms of the inverter in the fourth operating mode. FIG. 10 shows the inverter output voltage, current through the inverter-side inductor and auxiliary circuit current when $D \geq 50\%$, $$\frac{\psi}{2\pi} \leq 50\%, \text{ and } \frac{\psi}{2\pi} \leq 1 - D.$$

According to this figure, in order to provide ZVS condition for the power semiconductors, the following conditions should be satisfied:

$$I_{a41} \geq I_{g41} + I_z \quad (15)$$

$$I_{a42} \geq I_{g42} + I_z \quad (16)$$

According to FIG. 10, Equations (15) and (16), the ZVS conditions are derived as:

$$\frac{v_{dc}}{L_{aux}f}(1-D)\left(D - \frac{\psi}{2\pi}\right) \geq \left(I_o - \frac{V_{dc} - v_g}{2L_g f}\left(D - \frac{\psi}{2\pi}\right)\right) + C_{So}\frac{V_{dc}}{t_d} \quad (17)$$

$$\frac{v_{dc}}{L_{aux}f}D\left[(1-D) - \frac{\psi}{2\pi}\right] \geq \left[I_o - \frac{V_{dc} + v_g}{2L_g f}\left[(1-D) - \frac{\psi}{2\pi}\right]\right] + C_{So}\frac{V_{dc}}{t_d} \quad (18)$$

According to (17) and (18), the optimal values of the switching frequency and the phase-shift are derived as:

$$\psi_{opt}^{AP} = 2\pi \frac{V_{dc}(1-2D) + v_g}{\frac{2L_g}{L_{aux}}V_{dc}(2D-1) + 2v_g} \quad (19)$$

$$f_{opt}^{AP} = \frac{2L_g V_{dc}(1-D)\left(D - \frac{\psi_{opt}^{AP}}{2\pi}\right) + L_{aux}(V_{dc} - v_g)\left(D - \frac{\psi_{opt}^{AP}}{2\pi}\right)}{2L_g L_{aux}\left(I_o + C_{So}\frac{V_{dc}}{t_d}\right)} \quad (20)$$

Figure 11:
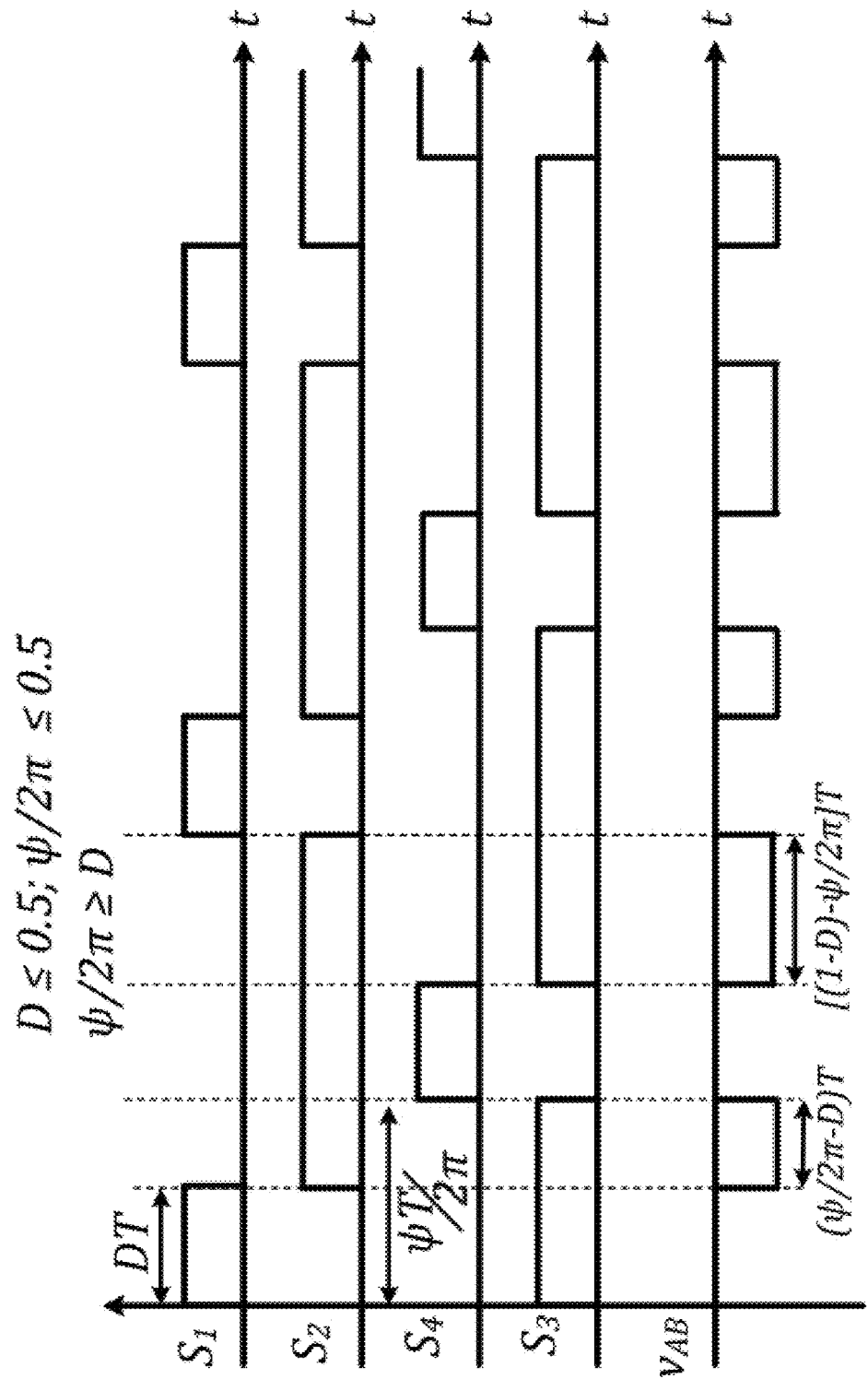
FIGS. 11-14 are waveforms for the negative cycles of the four operating modes.
Figure 12:
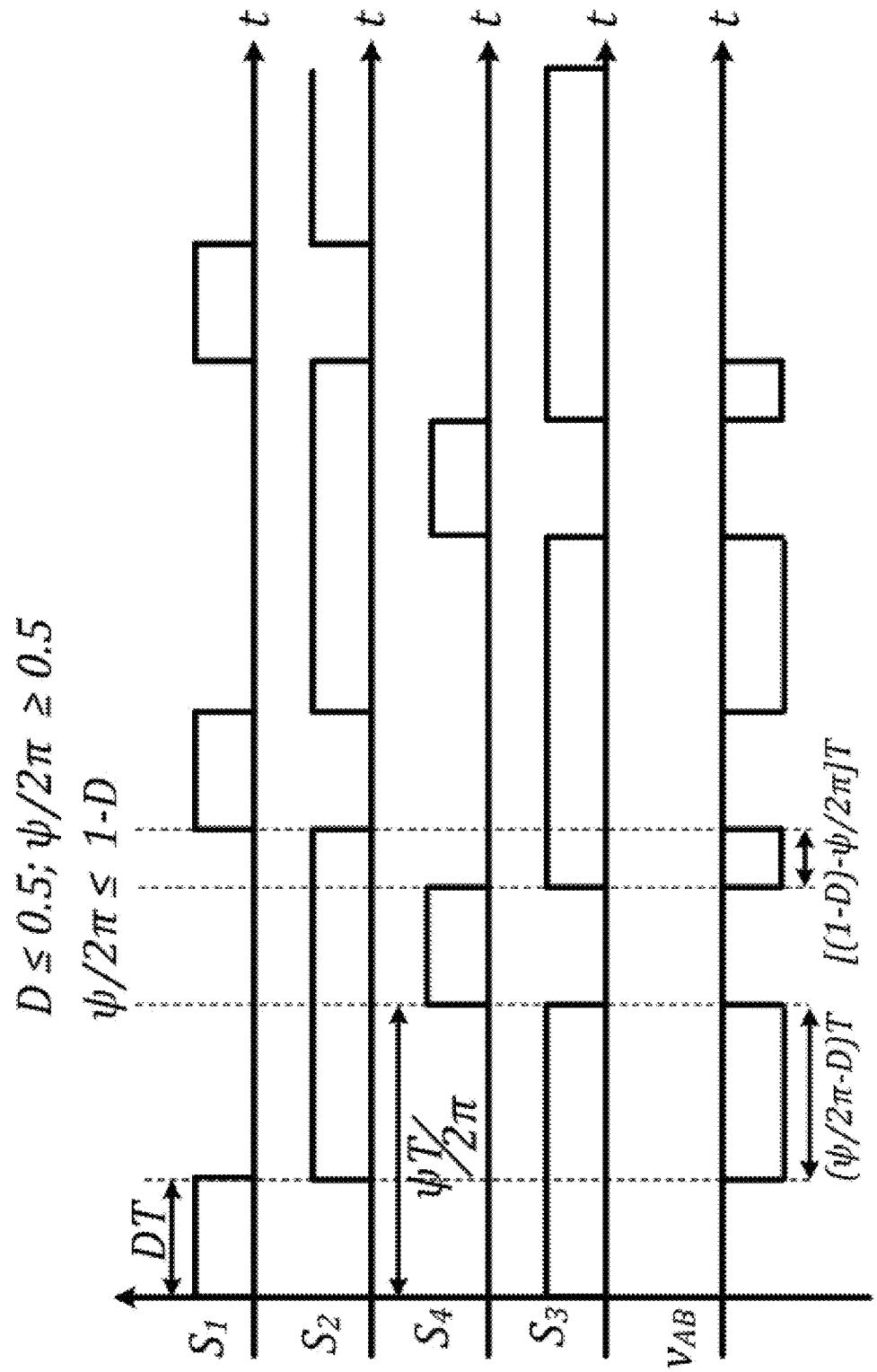
Figure 13:
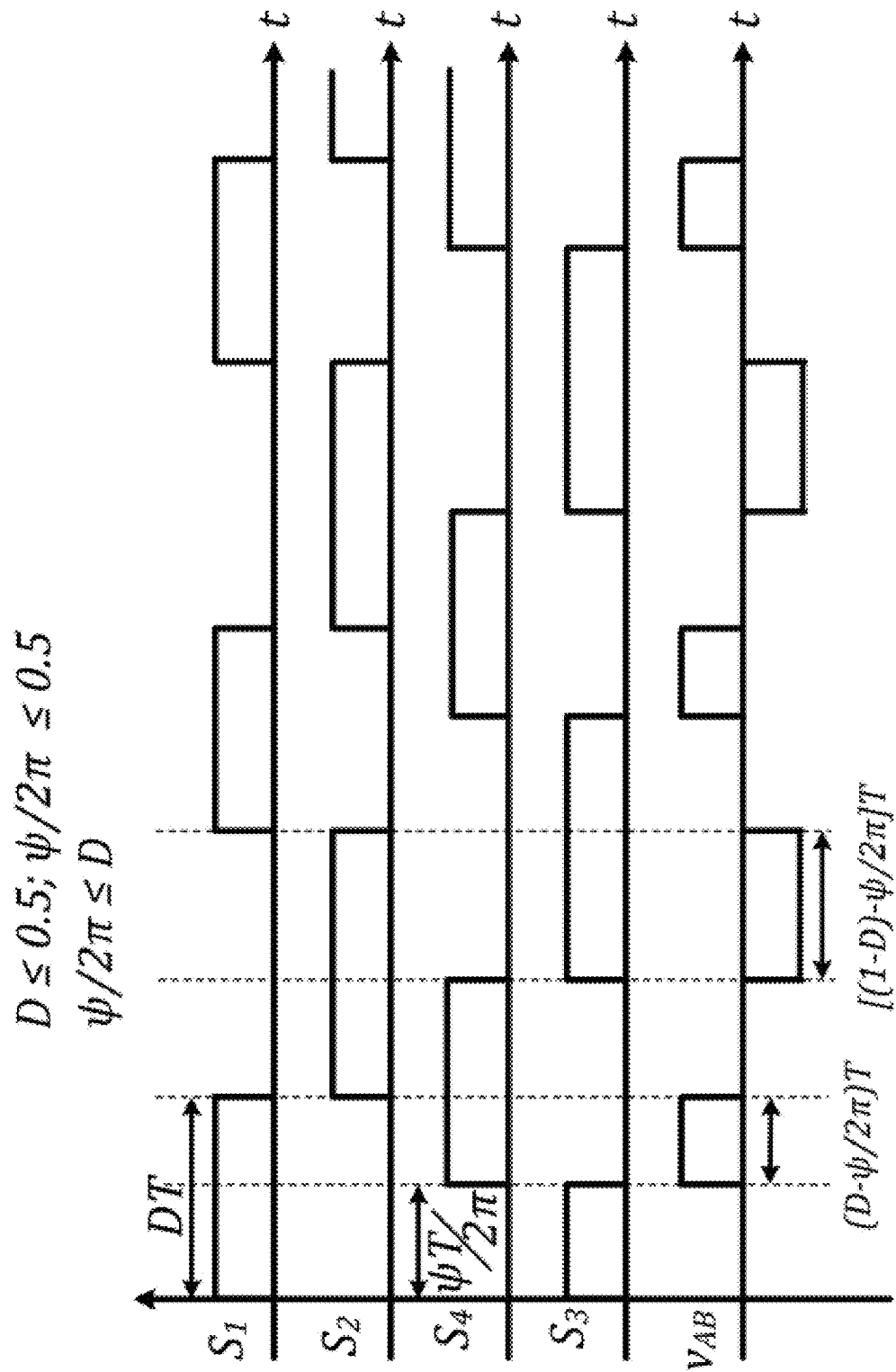
Figure 14:
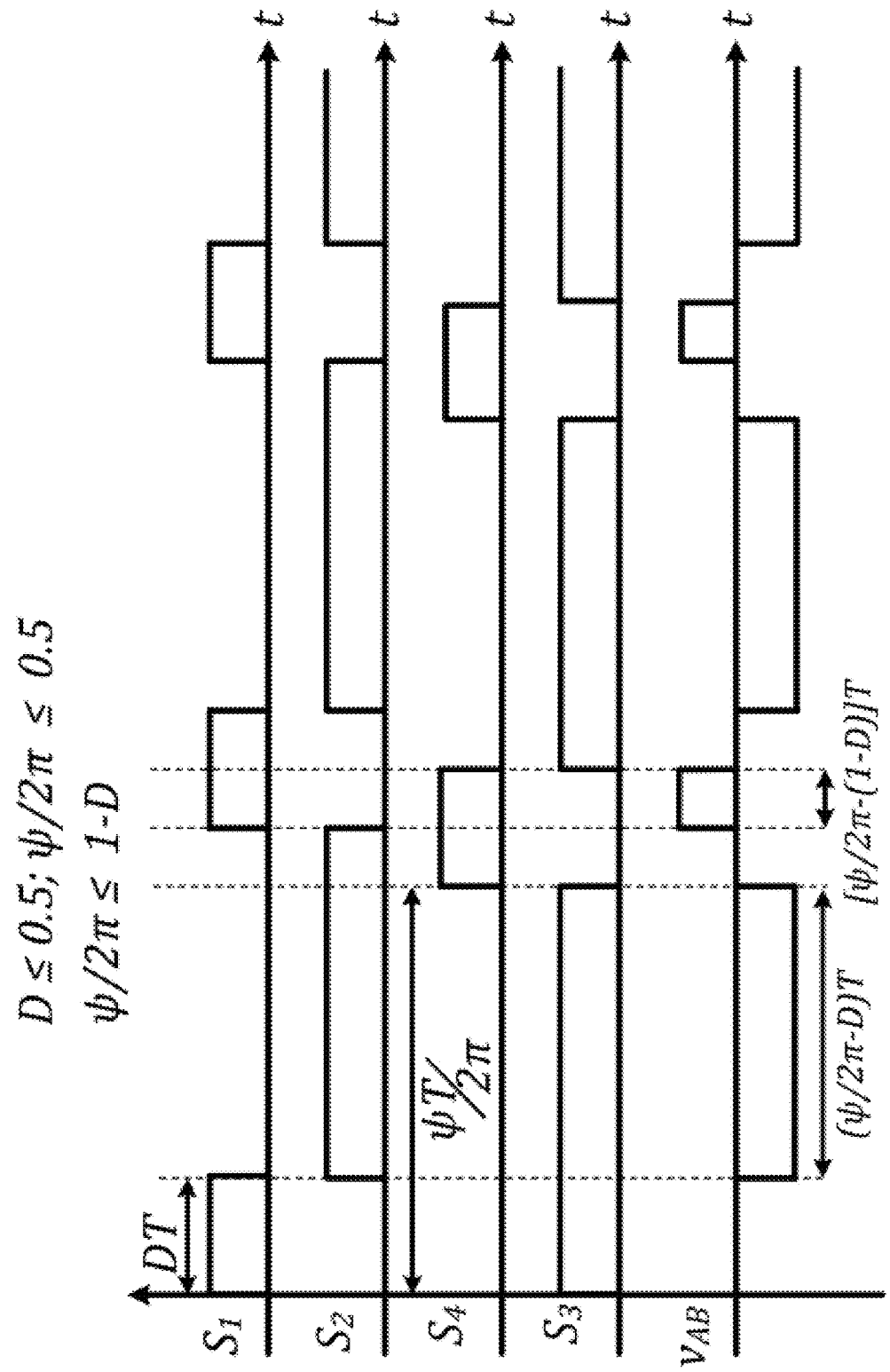

Similarly, the negative cycle has four operating modes. FIG. 11, FIG. 12, FIG. 13, and FIG. 14 show the switching waveforms in these modes. In the case of FIG. 11 and FIG. 12, the inverter output voltage is switching between 0 and $-V_{dc}$. Whereas, in the case of FIG. 13 and FIG. 14, the inverter output voltage switches between $V_{dc}$, 0, and $-V_{dc}$. Similar to the positive cycle, the optimal operating frequency and phase-shift for the first and second cases (FIG. 11 and FIG. 12) are given by:

$$f_{opt}^{1N} = \frac{(0.5-D)[2L_g V_{dc} D + L_{aux}(V_{dc} - v_g)]}{2L_g L_{aux}\left(I_o + C_{So}\frac{V_{dc}}{t_d}\right)} \quad (21)$$

$$\psi_{opt}^{1N} = \pi \quad (22)$$

The optimal operating frequency and phase-shift for the third and fourth cases (FIG. 13 and FIG. 14) are given by:

$$\psi_{opt}^{3N} = 2\pi \frac{V_{dc}(1-2D) - v_g}{\frac{2L_g}{L_{aux}}V_{dc}(1-2D) - 2v_g} \quad (23)$$

$$f_{opt}^{3N} = \frac{2L_g V_{dc}(1-D)\left(\frac{D - \psi_{opt}^{3N}}{2\pi}\right) + L_{aux}(V_{dc} - v_g)\left(D - \frac{\psi_{opt}^{3N}}{2\pi}\right)}{2L_g L_{aux}\left(I_o + C_{So}\frac{V_{dc}}{t_d}\right)} \quad (24)$$

$$\psi_{opt}^{AN} = 2\pi \frac{V_{dc}(2D-1)(L_{aux} + 2L_g) + v_g L_{aux}}{2L_g V_{dc}(2D-1) + 2L_{aux} v_g} \quad (25)$$

$$f_{opt}^{AN} = \frac{2L_g V_{dc}(D)\left(\frac{\psi_{opt}^{AN}}{2\pi} - D\right) + L_{aux}(V_{dc} + v_g)\left(\frac{\psi_{opt}^{AN} - D}{2\pi}\right)}{2L_g L_{aux}\left(I_o + C_{So}\frac{V_{dc}}{t_d}\right)} \quad (26)$$

Figure 15:
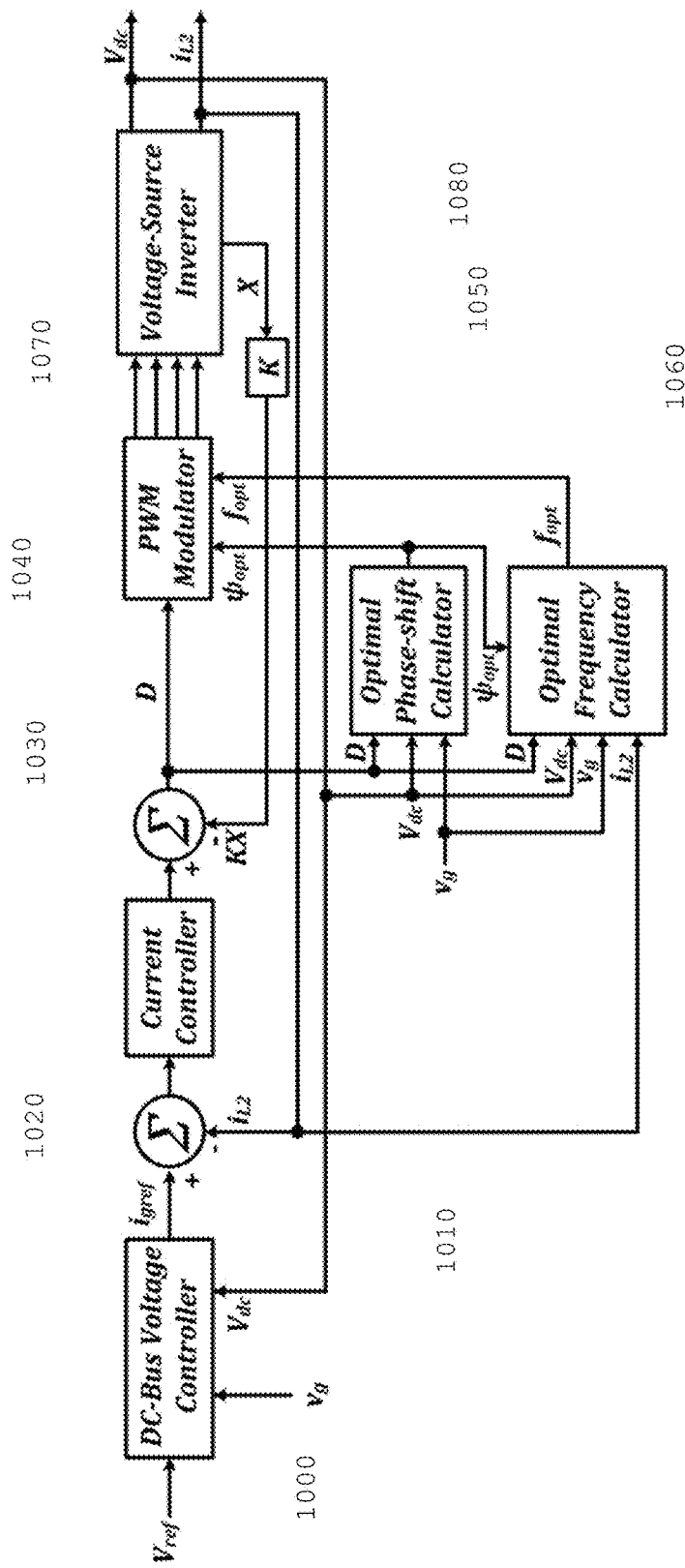
FIG. 15 is a block diagram of a control system according to another aspect of the invention.

FIG. 15 shows the control system of the ZVS inverter of the present invention. According to FIG. 15, three control variables are determined by the control system. The first variable is the duty ratio, D, which controls the output current of the DC/AC inverter, $i_{L2}$ as well as the DC-bus voltage $V_{dc}$. This control loop includes an external voltage loop, which determines the reference value for the output current, and an internal current loop, which ensures the tracking of the output current to the reference value determined by the external voltage loop. The second and third control variables are the optimal values of the phase-shift and switching frequency. The phase-shift and switching frequency are determined such that the current through the auxiliary circuit is minimized, which results in the optimal operation of the inverter. The optimal values of the phase-shift and frequency are calculated based on Equations (6), (7), (12), (13), (20), (21), (23), (22), (19), and (18).

From FIG. 15, the control subsystem has a reference voltage $V_{ref}$ which is received, along with inputs $v_g$ and $V_{dc}$ (both fed back from the subsystem output), by a DC-Bus Voltage Controller 1000. The output $i_{gref}$ of the controller 1000 is received by an adder 1010. The adder 1010 substracts the value of $i_{L2}$ (fed back from the system output) from the output of the controller 1000 and sends the accumulator output to a current controller 1020. The output of the current controller 1020 is sent to another adder 1030 and this adder subtracts a value KX from this current controller output (KX is the linear state-feedback of the system). The result of the adder 1030 is the duty cycle D and is sent to a pulse width modulation (PWM) modulator 1040. The PWM modulator 1040 also receives the optimal phase-shift and the optimal switching frequency from the optimal phase-shift calculator 1050 and from the optimal frequency calculator 1060. The output of the PWM modulator is sent to the voltage-source inverter 1070 (described above) which output two signals, $V_{dc}$ and $i_{L2}$. Both of these signals are fed back to the control subsystem as necessary. Also output from the inverter 1070 is a state vector X which is multiplied by a constant vector K 1080 to provide the linear state-feedback KX for adder 1030.

It can also be seen from FIG. 15 that the phase-shift calculator 1050 and the frequency calculator 1060 both receive, as inputs, the value D (duty cycle), the signal $V_{dc}$ (from the control subsystem output), and the signal $v_g$. In addition to these inputs, the frequency calculator 1060 also receives the signal $i_{L2}$.

Figure 16:
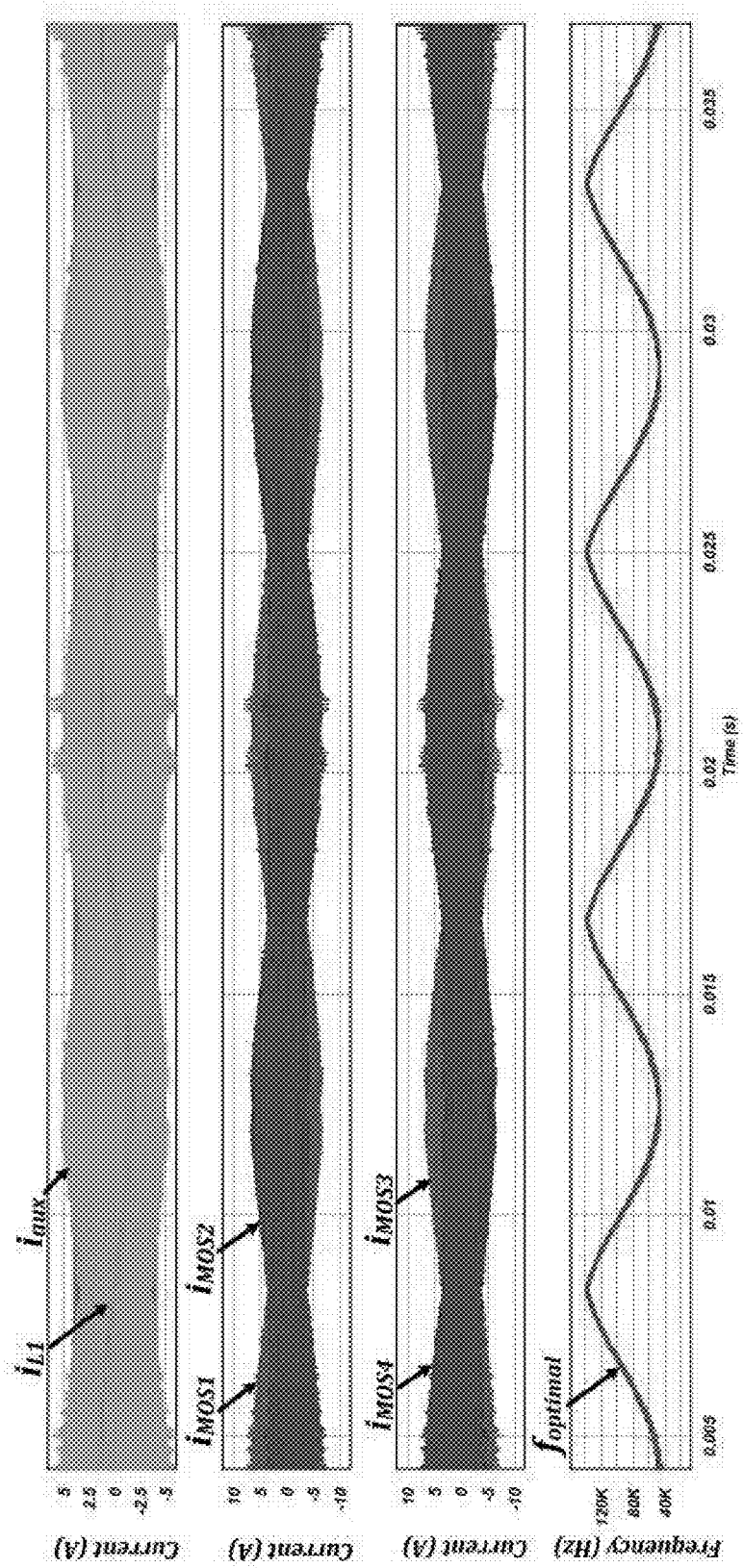
FIG. 16 are inverter waveforms for the inverter with uni-polar switching.
Figure 17:
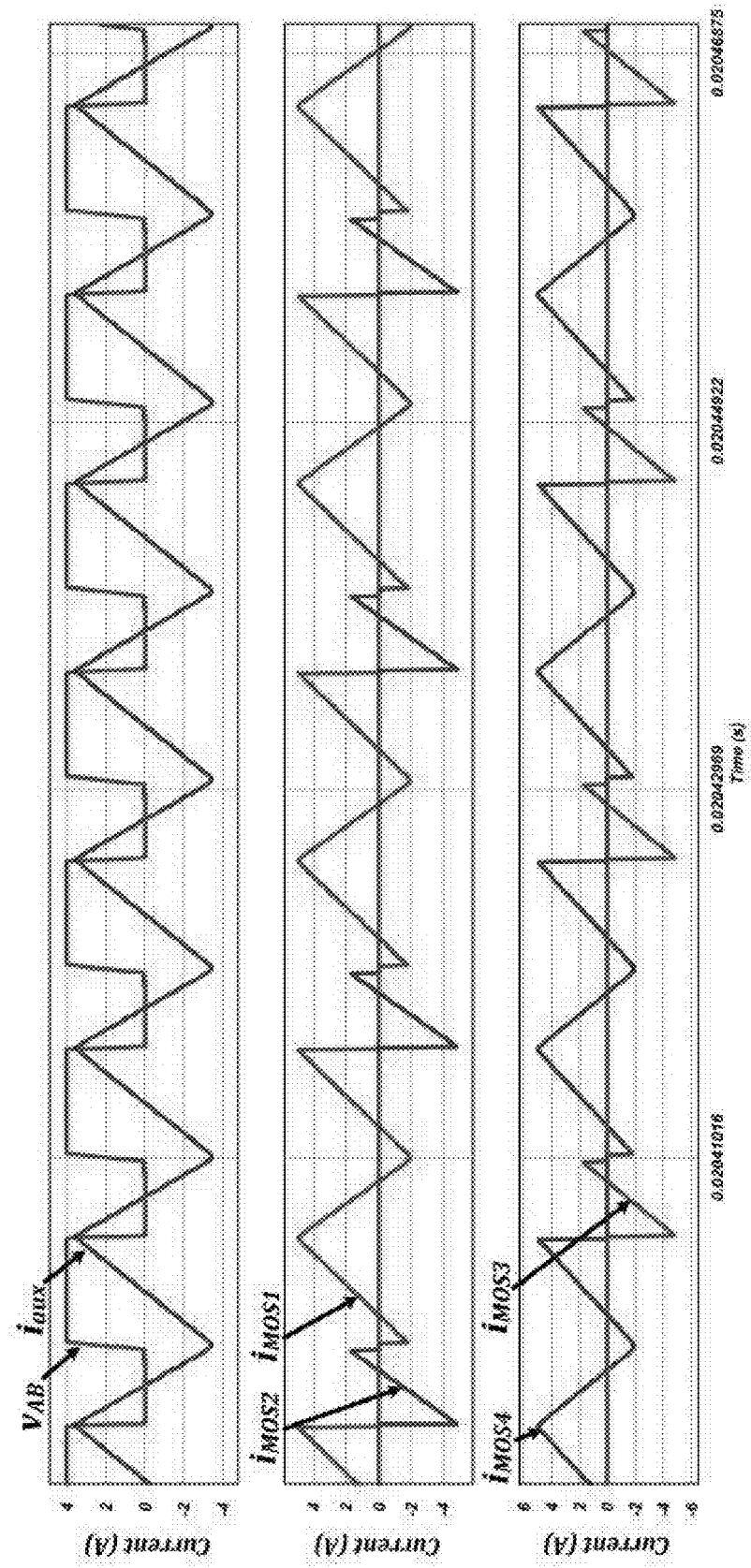
FIGS. 17 and 18 are enlarged versions of FIG. 16 in the positive and negative cycles.
Figure 18:
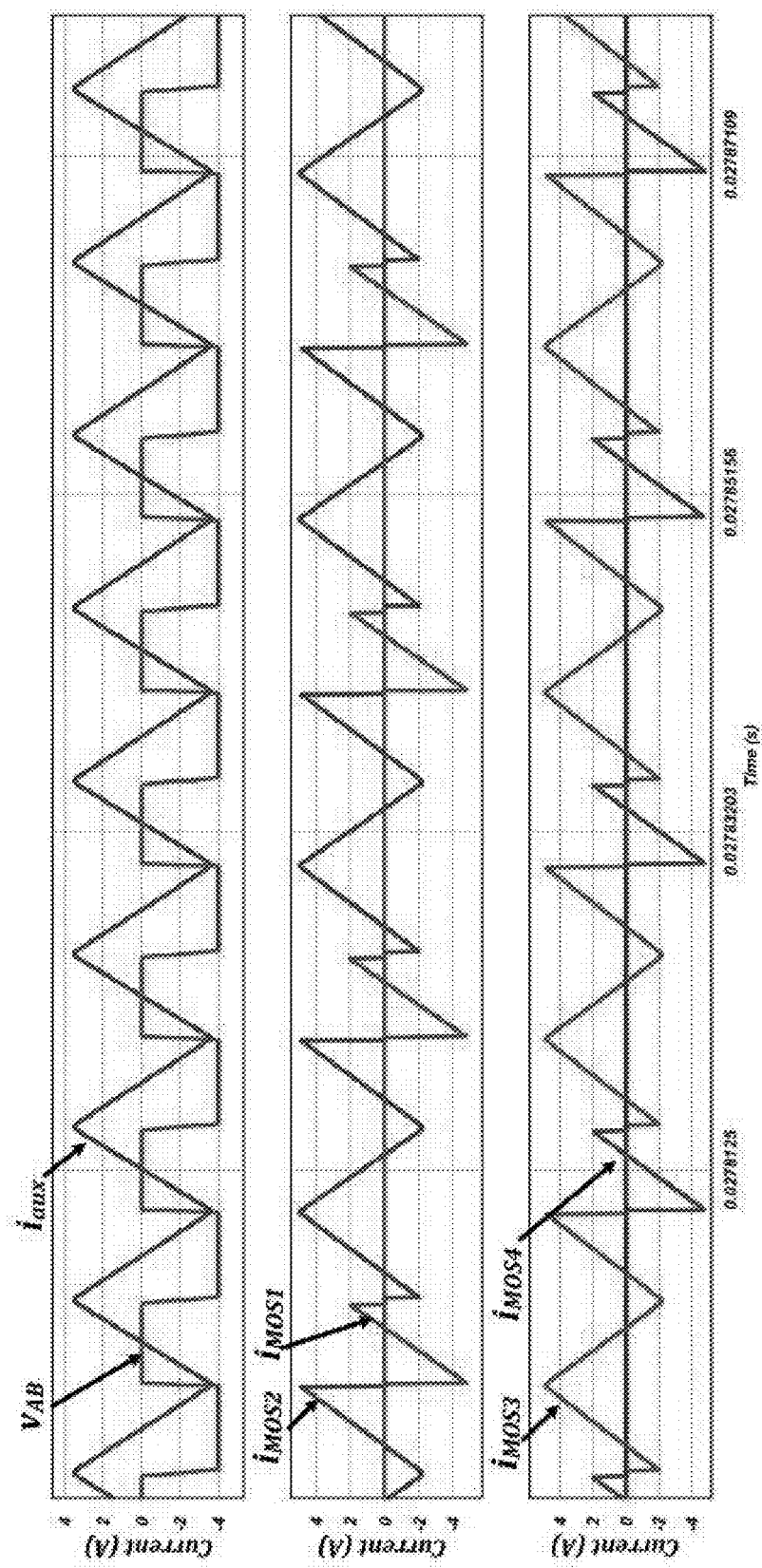

FIG. 16 shows the inverter waveforms for the inverter with uni-polar switching (Case 1 and case 2 for the positive cycle as well as case 1 and case 2 for the negative cycle). FIG. 16 confirms that the phase-shift and frequency control ensure the optimal operation of inverter by minimizing the current through the auxiliary circuit. FIG. 17 and FIG. 18 show the enlarged version of FIG. 16 in the positive cycle and the negative cycle respectively.

Figure 19:
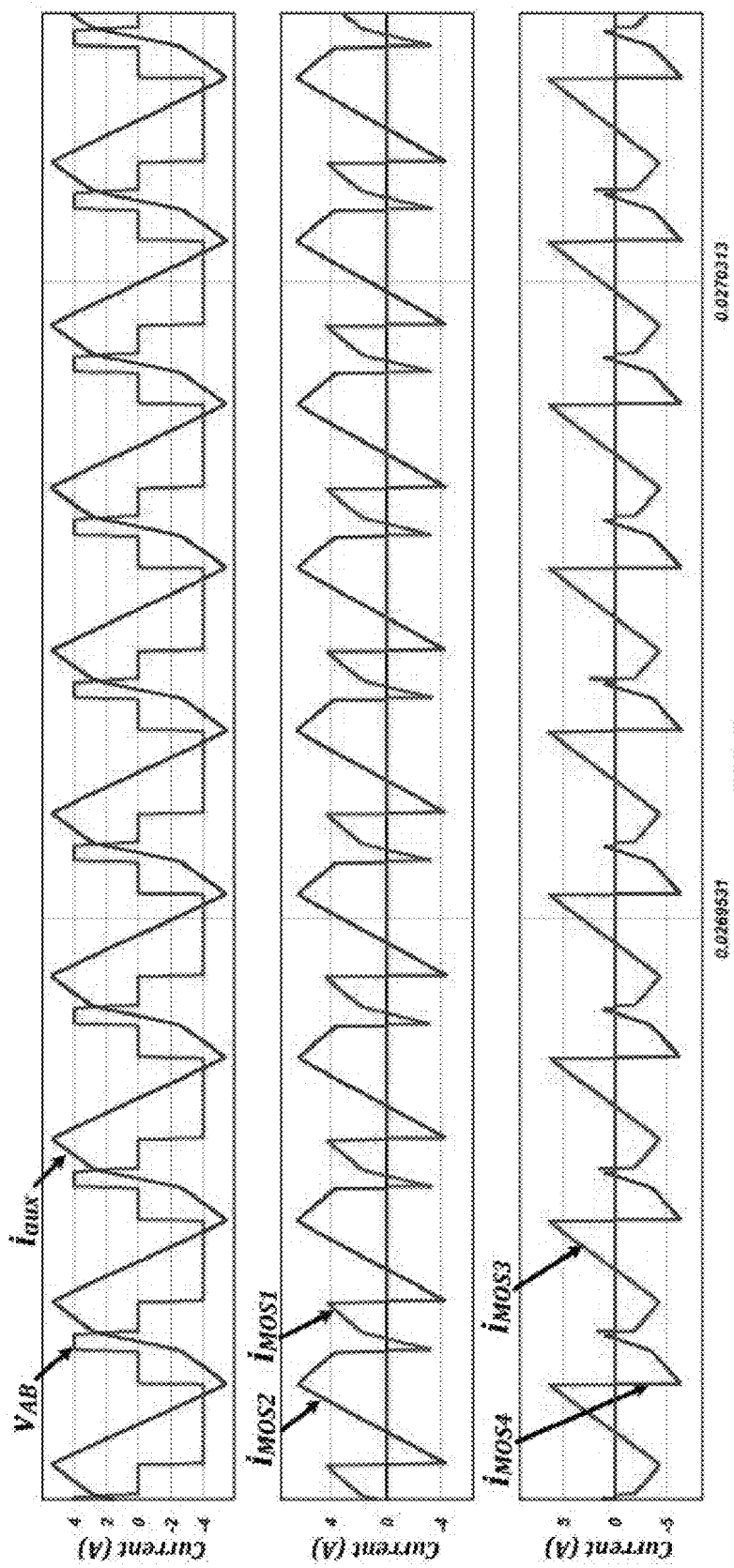
FIG. 19 are inverter waveforms for the inverter with three-level voltage switching.

FIG. 19 shows the inverter waveforms for the inverter with three-level voltage switching (Case 3 and case 4 for the positive cycle as well as case 3 and case 4 for the negative cycle). The control system adjusts the auxiliary circuit current such that the current through the auxiliary circuit is minimized, and at the same time the power switches have ZVS.

Figure 20:
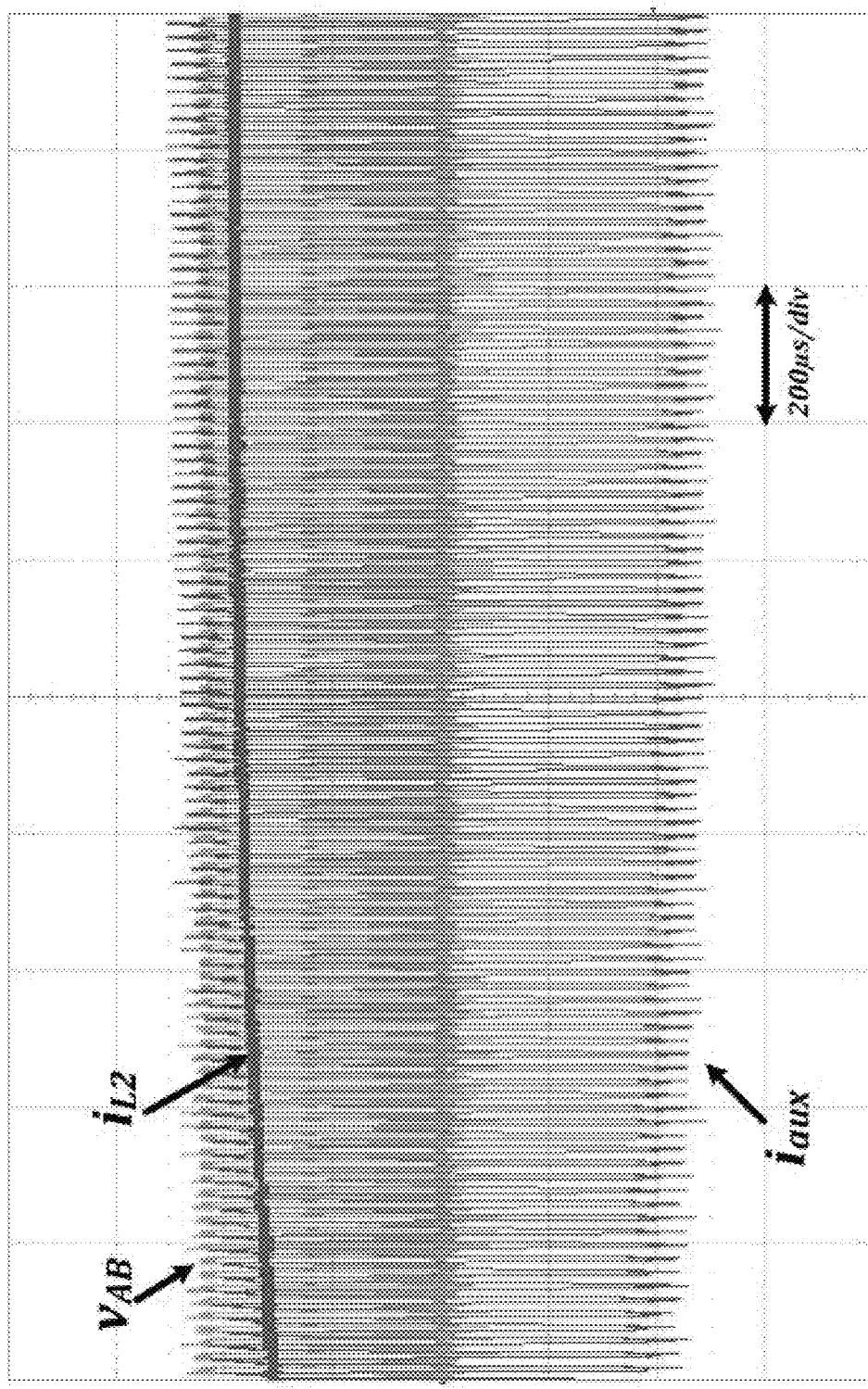
FIG. 20 show experimental waveforms for the inverter illustrating the output voltage of the inverter, the current injected into the grid, and the auxiliary circuit current.

FIG. 20 shows the experimental waveforms of the inverter. This figure shows the output voltage of the inverter, the current injected to the grid, and the auxiliary circuit current.

In one embodiment of the invention, the control system and the equations used to define the duty ratio, the switching frequency, and the phase-shift of the gate pulses can be implemented using a microcontroller with suitable programming and discrete electrical components. Similarly, the control system and the programming needed to implement the various equations for the duty ratio, switching frequency, and phase-shift of the gate pulses can be implemented using an ASIC (application specific integrated circuit).

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g."C") or an object-oriented language (e.g."C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A circuit comprising:
a DC bus capacitor;
a full bridge inverter coupled in parallel to said DC bus capacitor;
an output filter coupled to said full bridge inverter;
an auxiliary circuit coupled to said inverter;
wherein
said full bridge inverter comprises a leading leg and a lagging leg, each leg comprising a pair of power semiconductor subcircuits coupled in series to each other, said leading leg having its pair of power semiconductor subcircuits being coupled to each other at a first coupling point, said lagging leg having its pair of power semiconductor subcircuits being coupled to each other at a second coupling point;
said auxiliary circuit comprises an auxiliary inductor coupled in series to an auxiliary capacitor, said auxiliary circuit being coupled between said first coupling point and said second coupling point;
said output filter comprises a pair of inductors and a capacitor, said pair of inductors being coupled to each other in series by way of a third coupling point, said capacitor being coupled between said second coupling point and said third coupling point, a first one of said pair of inductors being coupled to said first coupling point;
an output of said circuit being coupled between said second coupling point and a second one of said pair of inductors;
said circuit is controlled by a control subsystem, said control subsystem being for adiusting a duty ratio for gate pulses applied to said power semiconductor subcircuits for controlling an output current.

2. A circuit according to claim 1 wherein said control subsystem is further for adjusting a switching frequency of said gate pulses.

3. A circuit according to claim 1 wherein said control subsystem is further for adjusting a phase-shift between said gate pulses.

4. A circuit according to claim 1 wherein said circuit is controlled by a control subsystem, said control subsystem being for:
adjusting a duty ratio of gate pulses applied to said power semiconductor subcircuits for controlling an output current;
adjusting a switching frequency of said gate pulses; and
adjusting a phase-shift between said gate pulses.

5. A circuit according to claim 1 wherein said control subsystem comprises:
a block for calculating a phase-shift between said gate pulses;
a block for calculating a switching frequency for said gate pulses;
at least one component for determining said duty ratio; and
a pulse width modulator for sending control signals to said circuit.

6. A circuit according to claim 1 wherein an optimal switching frequency and phase shift for said gate pulses are calculated according to:

$$f_{opt}^{1P} = \frac{(D-0.5)[2L_g V_{dc}(1-D) + L_{aux}(V_{dc} - v_g)]}{2L_g L_{aux}\left(I_o + C_{So}\dfrac{V_{dc}}{t_d}\right)}$$

$$\psi_{opt}^{1P} = \pi$$

where
- $\psi_{opt}^{1P}$ is an optimal phase shift;
- $f_{opt}^{1P}$ is an optimal switching frequency;
- $V_{dc}$ is a DC-bus voltage;
- $L_{aux}$ is an inductance of said auxiliary inductor;
- $L_g$ is a sum of inductances of said pair of inductors in said output filter;
- $C_{So}$ represents output capacitors of said power semiconductor subcircuits;
- D is a duty ratio for gate pulses applied to said power semiconductor subcircuits;
- $v_g$ is an output voltage of said circuit;
- $t_d$ represents dead-times between gate pulses for said power semiconductors in said power semiconductor subcircuits in one leg of said circuit.

7. A circuit according to claim 1 wherein an optimal switching frequency and phase shift for said gate pulses are calculated according to:

$$\psi_{opt}^{3P} = 2\pi \frac{V_{dc}(1-2D) - v_g}{\frac{2L_g}{L_{aux}}V_{dc}(1-2D) - 2v_g}$$

$$f_{opt}^{3P} = \frac{2L_g V_{dc}(D)\left(\frac{\psi_{opt}^{3P}}{2\pi} - D\right) + L_{aux}(V_{dc} + v_g)\left(\frac{\psi_{opt}^{3P}}{2\pi} - D\right)}{2L_g L_{aux}\left(I_o + C_{So}\frac{V_{dc}}{t_d}\right)}$$

where
- $\psi_{opt}^{3P}$ is an optimal phase shift;
- $f_{opt}^{3P}$ is an optimal switching frequency;
- $V_{dc}$ is a DC-bus voltage;
- $L_{aux}$ is an inductance of said auxiliary inductor;
- $L_g$ is a sum of inductances of said pair of inductors in said output filter;
- $C_{So}$ represents output capacitors of said power semiconductor subcircuits;
- D is a duty ratio for gate pulses applied to said power semiconductor subcircuits;
- $v_g$ is an output voltage of said circuit;
- $t_d$ represents dead-times between gate pulses for said power semiconductors in said power semiconductor subcircuits in one leg of said circuit.

8. A circuit according to claim 1 wherein an optimal switching frequency and phase shift for said gate pulses are calculated according to:

$$\psi_{opt}^{4P} = 2\pi \frac{V_{dc}(1-2D) + v_g}{\frac{2L_g}{L_{aux}}V_{dc}(2D-1) + 2v_g}$$

$$f_{opt}^{4P} = \frac{2L_g V_{dc}(1-D)\left(D - \frac{\psi_{opt}^{4P}}{2\pi}\right) + L_{aux}(V_{dc} - v_g)\left(D - \frac{\psi_{opt}^{4P}}{2\pi}\right)}{2L_g L_{aux}\left(I_o + C_{So}\frac{V_{dc}}{t_d}\right)}$$

where
- $\psi_{opt}^{4P}$ is an optimal phase shift;
- $f_{opt}^{4P}$ is an optimal switching frequency;
- $V_{dc}$ is a DC-bus voltage;
- $L_{aux}$ is an inductance of said auxiliary inductor;
- $L_g$ is a sum of inductances of said pair of inductors in said output filter;
- $C_{So}$ represents output capacitors of said power semiconductor subcircuits;
- D is a duty ratio for gate pulses applied to said power semiconductor subcircuits;
- $v_g$ is an output voltage of said circuit;
- $t_d$ represents dead-times between gate pulses for said power semiconductors in said power semiconductor subcircuits in one leg of said circuit.

9. A circuit according to claim 1 wherein an optimal switching frequency and phase shift for said gate pulses are calculated according to:

$$f_{opt}^{1N} = \frac{(0.5 - D)[2L_g V_{dc} D + L_{aux}(V_{dc} - v_g)]}{2L_g L_{aux}\left(I_o + C_{So}\frac{V_{dc}}{t_d}\right)}$$

$$\psi_{opt}^{1N} = \pi$$

where
- $\psi_{opt}^{1N}$ is an optimal phase shift;
- $f_{opt}^{1N}$ is an optimal switching frequency;
- $V_{dc}$ is a DC-bus voltage;
- $L_{aux}$ is an inductance of said auxiliary inductor;
- $L_g$ is a sum of inductances of said pair of inductors in said output filter;
- $C_{So}$ represents output capacitors of said power semiconductor subcircuits;
- D is a duty ratio for gate pulses applied to said power semiconductor subcircuits;
- $v_g$ is an output voltage of said circuit;
- $t_d$ represents dead-times between gate pulses for said power semiconductors in said power semiconductor subcircuits in one leg of said circuit.

10. A circuit according to claim 1 wherein an optimal switching frequency and phase shift for said gate pulses are calculated according to:

$$\psi_{opt}^{3N} = 2\pi \frac{V_{dc}(2D-1) - v_g}{\frac{2L_g}{L_{aux}}V_{dc}(1-2D) - 2v_g}$$

$$f_{opt}^{3N} = \frac{2L_g V_{dc}(1-D)\left(\frac{D - \psi_{opt}^{3N}}{2\pi}\right) + L_{aux}(V_{dc} - v_g)\left(D - \frac{\psi_{opt}^{3N}}{2\pi}\right)}{2L_g L_{aux}\left(I_o + C_{So}\frac{V_{dc}}{t_d}\right)}$$

where
- $\psi_{opt}^{3N}$ is an optimal phase shift;
- $f_{opt}^{3N}$ is an optimal switching frequency;
- $V_{dc}$ is a DC-bus voltage;
- $L_{aux}$ is an inductance of said auxiliary inductor;
- $L_g$ is a sum of inductances of said pair of inductors in said output filter;
- $C_{So}$ represents output capacitors of said power semiconductor subcircuits;
- D is a duty ratio for gate pulses applied to said power semiconductor subcircuits;
- $v_g$ is an output voltage of said circuit;
- $t_d$ represents dead-times between gate pulses for said power semiconductors in said power semiconductor subcircuits in one leg of said circuit.

11. A circuit according to claim 1 wherein an optimal switching frequency and phase shift for said gate pulses are calculated according to:

$$\psi_{opt}^{4N} = 2\pi \frac{V_{dc}(2D-1)(L_{aux}+2L_g)+v_g L_{aux}}{2L_g V_{dc}(2D-1)+2L_{aux}v_g}$$

$$f_{opt}^{4N} = \frac{2L_g V_{dc} D\left(\frac{\psi_{opt}^{4N}}{2\pi}-D\right)+L_{aux}(V_{dc}-v_g)\left(\frac{\psi_{opt}^{4N}-D}{2\pi}\right)}{2L_g L_{aux}\left(I_o+C_{So}\frac{V_{dc}}{t_d}\right)}$$

where
$\psi_{opt}^{4N}$ is an optimal phase shift;
$f_{opt}^{4N}$ is an optimal switching frequency;
$V_{dc}$ is a DC-bus voltage;
$L_{aux}$ is an inductance of said auxiliary inductor;
$L_g$ is a sum of inductances of said pair of inductors in said output filter;
$C_{So}$ represents output capacitors of said power semiconductor subcircuits;
D is a duty ratio for gate pulses applied to said power semiconductor subcircuits;
$v_g$ is an output voltage of said circuit;
$t_d$ represents dead-times between gate pulses for said power semiconductors in said power semiconductor subcircuits in one leg of said circuit.

12. A method for minimizing switching losses in a full-bridge inverter system, the method comprising:
adjusting a duty ratio of gate pulses applied to power semiconductors in said inverter system to control an output of said inverter system;
adjusting a switching frequency and a phase shift of said gate pulses to control a current passing through an auxiliary circuit coupled to an inverter circuit in said inverter system;
wherein
said switching frequency and said phase-shift are adjusted to charge and discharge output capacitors associated with power semiconductors in one leg of said inverter circuit during switching transitions for said inverter circuit;
said inverter circuit comprises a leading leg and a lagging leg, each leg comprising a pair of power semiconductor subcircuits coupled in series to each other, said leading leg having its pair of power semiconductor subcircuits being coupled to each other at a first coupling point, said lagging leg having its pair of power semiconductor subcircuits being coupled to each other at a second coupling point;
said auxiliary circuit comprises an auxiliary inductor coupled in series to an auxiliary capacitor, said auxiliary circuit being coupled between said first coupling point and said second coupling point;
said inverter system comprises an output filter, said output filter comprising a pair of inductors and a capacitor, said pair of inductors being coupled to each other in series by way of a third coupling point, said capacitor being coupled between said second coupling point and said third coupling point, a first one of said pair of inductors being coupled to said first coupling point;
an output of said inverter system is coupled between said second coupling point and a second one of said pair of inductors.

13. A method according to claim 12 further including a step of calculating an optimal switching frequency and phase-shift for said gate pulses according to:

$$f_{opt}^{1P} = \frac{(D-0.5)[2L_g V_{dc}(1-D)+L_{aux}(V_{dc}-v_g)]}{2L_g L_{aux}\left(I_o+C_{So}\frac{V_{dc}}{t_d}\right)}$$

$$\psi_{opt}^{1P} = \pi$$

where
$\psi_{opt}^{1P}$ is an optimal phase shift;
$f_{opt}^{1P}$ is an optimal switching frequency;
$V_{dc}$ is a DC-bus voltage;
$L_{aux}$ is an inductance of said auxiliary inductor;
$L_g$ is a sum of inductances of said pair of inductors in said output filter;
$C_{So}$ represents output capacitors of said power semiconductor subcircuits;
D is a duty ratio for gate pulses applied to said power semiconductor subcircuits;
$v_g$ is an output voltage of said circuit;
$t_d$ represents dead-times between gate pulses for said power semiconductors in said power semiconductor subcircuits in one leg of said circuit.

14. A method according to claim 12 further including a step of calculating an optimal switching frequency and phase-shift for said gate pulses according to:

$$\psi_{opt}^{3P} = 2\pi \frac{V_{dc}(1-2D)-v_g}{\frac{2L_g}{L_{aux}}V_{dc}(1-2D)-2v_g}$$

$$f_{opt}^{3P} = \frac{2L_g V_{dc} D\left(\frac{\psi_{opt}^{3P}}{2\pi}-D\right)+L_{aux}(V_{dc}+v_g)\left(\frac{\psi_{opt}^{3P}}{2\pi}-D\right)}{2L_g L_{aux}\left(I_o+C_{So}\frac{V_{dc}}{t_d}\right)}$$

where
$\psi_{opt}^{3P}$ is an optimal phase shift;
$f_{opt}^{3P}$ is an optimal switching frequency;
$V_{dc}$ is a DC-bus voltage;
$L_{aux}$ is an inductance of said auxiliary inductor;
$L_g$ is a sum of inductances of said pair of inductors in said output filter;
$C_{So}$ represents output capacitors of said power semiconductor subcircuits;
D is a duty ratio for gate pulses applied to said power semiconductor subcircuits;
$v_g$ is an output voltage of said circuit;
$t_d$ represents dead-times between gate pulses for said power semiconductors in said power semiconductor subcircuits in one leg of said circuit.

15. A method according to claim 12 further including a step of calculating an optimal switching frequency and phase-shift for said gate pulses according to:

$$\psi_{opt}^{4P} = 2\pi \frac{V_{dc}(1-2D)-v_g}{\frac{2L_g}{L_{aux}}V_{dc}(2D-1)+2v_g}$$

$$f_{opt}^{4P} = \frac{2L_g V_{dc}(1-D)\left(D-\frac{\psi_{opt}^{4P}}{2\pi}\right)+L_{aux}(V_{dc}+v_g)\left(D-\frac{\psi_{opt}^{4P}}{2\pi}\right)}{2L_g L_{aux}\left(I_o+C_{So}\frac{V_{dc}}{t_d}\right)}$$

where
- $\psi_{opt}^{4P}$ is an optimal phase shift;
- $f_{opt}^{4P}$ is an optimal switching frequency;
- $V_{dc}$ is a DC-bus voltage;
- $L_{aux}$ is an inductance of said auxiliary inductor;
- $L_g$ is a sum of inductances of said pair of inductors in said output filter;
- $C_{So}$ represents output capacitors of said power semiconductor subcircuits;
- D is a duty ratio for gate pulses applied to said power semiconductor subcircuits;
- $v_g$ is an output voltage of said circuit;
- $t_d$ represents dead-times between gate pulses for said power semiconductors in said power semiconductor subcircuits in one leg of said circuit.

16. A method according to claim 12 further including a step of calculating an optimal switching frequency and phase-shift for said gate pulses according to:

$$f_{opt}^{1N} = \frac{(D-0.5)[2L_g V_{dc}(1-D) + L_{aux}(V_{dc}-v_g)]}{2L_g L_{aux}\left(I_o + C_{So}\frac{V_{dc}}{t_d}\right)}$$

$$\psi_{opt}^{1N} = \pi$$

where
- $\psi_{opt}^{1N}$ is an optimal phase shift;
- $f_{opt}^{1N}$ is an optimal switching frequency;
- $V_{dc}$ is a DC-bus voltage;
- $L_{aux}$ is an inductance of said auxiliary inductor;
- $L_g$ is a sum of inductances of said pair of inductors in said output filter;
- $C_{So}$ represents output capacitors of said power semiconductor subcircuits;
- D is a duty ratio for gate pulses applied to said power semiconductor subcircuits;
- $v_g$ is an output voltage of said circuit;
- $t_d$ represents dead-times between gate pulses for said power semiconductors in said power semiconductor subcircuits in one leg of said circuit.

17. A method according to claim 12 further including a step of calculating an optimal switching frequency and phase-shift for said gate pulses according to:

$$\psi_{opt}^{3N} = 2\pi \frac{V_{dc}(2D-1) - v_g}{\frac{2L_g}{L_{aux}}V_{dc}(1-2D) - 2v_g}$$

$$f_{opt}^{3N} = \frac{2L_g V_{dc}(1-D)\left(\frac{D - \psi_{opt}^{3N}}{2\pi}\right) + L_{aux}(V_{dc} - v_g)\left(D - \frac{\psi_{opt}^{3N}}{2\pi}\right)}{2L_g L_{aux}\left(I_o + C_{So}\frac{V_{dc}}{t_d}\right)}$$

where
- $\psi_{opt}^{3N}$ is an optimal phase shift;
- $f_{opt}^{3N}$ is an optimal switching frequency;
- $V_{dc}$ is a DC-bus voltage;
- $L_{aux}$ is an inductance of said auxiliary inductor;
- $L_g$ is a sum of inductances of said pair of inductors in said output filter;
- $C_{So}$ represents output capacitors of said power semiconductor subcircuits;
- D is a duty ratio for gate pulses applied to said power semiconductor subcircuits;
- $v_g$ is an output voltage of said circuit;
- $t_d$ represents dead-times between gate pulses for said power semiconductors in said power semiconductor subcircuits in one leg of said circuit.

18. A method according to claim 12 further including a step of calculating an optimal switching frequency and phase-shift for said gate pulses according to:

$$\psi_{opt}^{4N} = 2\pi \frac{V_{dc}(2D-1)(L_{aux}+2L_g) + v_g L_{aux}}{2L_g V_{dc}(2D-1) + 2L_{aux}v_g}$$

$$f_{opt}^{4N} = \frac{2L_g V_{dc} D\left(\frac{\psi_{opt}^{4N}}{2\pi} - D\right) + L_{aux}(V_{dc} + v_g)\left(\frac{\psi_{opt}^{4N} - D}{2\pi}\right)}{2L_g L_{aux}\left(I_o + C_{So}\frac{V_{dc}}{t_d}\right)}$$

where
- $\psi_{opt}^{4N}$ is an optimal phase shift;
- $f_{opt}^{4N}$ is an optimal switching frequency;
- $V_{dc}$ is a DC-bus voltage;
- $L_{aux}$ is an inductance of said auxiliary inductor;
- $L_g$ is a sum of inductances of said pair of inductors in said output filter;
- $C_{So}$ represents output capacitors of said power semiconductor subcircuits;
- D is a duty ratio for gate pulses applied to said power semiconductor subcircuits;
- $v_g$ is an output voltage of said circuit;
- $t_d$ represents dead-times between gate pulses for said power semiconductors in said power semiconductor subcircuits in one leg of said circuit.

* * * * *